United States Patent
Misaka

(10) Patent No.: US 9,313,384 B2
(45) Date of Patent: Apr. 12, 2016

(54) ZOOM LENS HAVING VIBRATION PREVENTION FUNCTION

(71) Applicant: SAMSUNG ELECTRONICS CO., LTD., Suwon-si, Gyeonggi-do (KR)

(72) Inventor: Makoto Misaka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 14/075,123

(22) Filed: Nov. 8, 2013

(65) Prior Publication Data

US 2014/0160347 A1    Jun. 12, 2014

(30) Foreign Application Priority Data

Dec. 7, 2012   (JP) .................................. 2012-268811
Jul. 12, 2013   (KR) ........................ 10-2013-0082460

(51) Int. Cl.
| | |
|---|---|
| *G02B 27/64* | (2006.01) |
| *G02B 15/14* | (2006.01) |
| *H04N 5/225* | (2006.01) |
| *G02B 15/173* | (2006.01) |

(52) U.S. Cl.
CPC .............. *H04N 5/2254* (2013.01); *G02B 15/14* (2013.01); *G02B 15/173* (2013.01); *G02B 27/646* (2013.01)

(58) Field of Classification Search
CPC ........ G02B 15/00; G02B 15/14; G02B 15/15; G02B 15/16; G02B 15/163; G02B 15/167; G02B 15/173; G02B 15/20; G02B 15/22; G02B 15/24; G02B 15/28; H04N 5/2254
See application file for complete search history.

(56) References Cited

U.S. PATENT DOCUMENTS

| | | | |
|---|---|---|---|
| 4,641,928 A * | 2/1987 | Hamanishi | .................... 359/687 |
| 5,502,594 A | 3/1996 | Suzuki et al. | |
| 5,579,171 A | 11/1996 | Suzuki et al. | |
| 5,715,088 A | 2/1998 | Suzuki | |
| 5,760,957 A | 6/1998 | Suzuki | |
| 5,920,435 A | 7/1999 | Shibayama | |
| 6,025,962 A | 2/2000 | Suzuki | |
| 6,236,516 B1 * | 5/2001 | Misaka | ........................ 359/690 |

(Continued)

FOREIGN PATENT DOCUMENTS

| | | | |
|---|---|---|---|
| JP | 06-123836 A | 5/1994 | |
| JP | 06-289298 A | 10/1994 | |

(Continued)

OTHER PUBLICATIONS

Search Report issued for EP 13192353.4 (Mar. 18, 2014).

*Primary Examiner* — Thong Nguyen

(74) *Attorney, Agent, or Firm* — Drinker Biddle & Reath LLP

(57) ABSTRACT

A zoom lens includes, sequentially from an object side, a first lens group having a positive refractive power, a second lens group having a negative refractive power, and a third lens group having a positive refractive power. When zoom is changed from a wide angle end to a telephoto end, an interval between the first lens group and the second lens group increases, and an interval between the second lens group and third lens group decreases. The second lens group comprises, sequentially from the object side, a second A lens group having a negative refractive power and a second B lens group having a negative refractive power, and the second B group is displaced in a direction perpendicular to an optical axis to perform a vibration prevention function.

14 Claims, 22 Drawing Sheets

(56) References Cited

U.S. PATENT DOCUMENTS

| | | |
|---|---|---|
| 6,246,519 B1 | 6/2001 | Suzuki |
| 7,336,429 B2 | 2/2008 | Shibayama |
| 2011/0102905 A1 | 5/2011 | Harada |
| 2011/0157719 A1 | 6/2011 | Yoneyama |
| 2011/0228160 A1* | 9/2011 | Imaoka et al. ................ 348/345 |

FOREIGN PATENT DOCUMENTS

| | | |
|---|---|---|
| JP | 06-337375 A | 12/1994 |
| JP | 07-027977 A | 1/1995 |
| JP | 07-027978 A | 1/1995 |
| JP | 07-111456 A | 4/1995 |
| JP | 07-325272 A | 12/1995 |
| JP | 09-152551 A | 6/1997 |
| JP | 09-230237 A | 9/1997 |
| JP | 10-111456 A | 4/1998 |
| JP | 2001-356381 A | 12/2001 |
| JP | 2002-296501 A | 10/2002 |
| JP | 2006-267425 A | 10/2006 |

* cited by examiner

FIG. 11
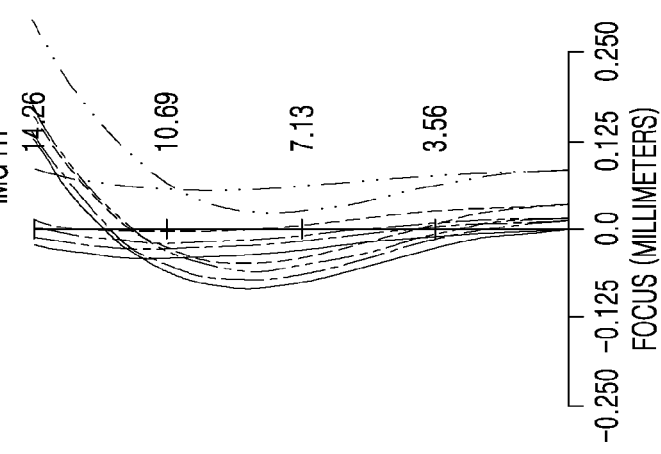
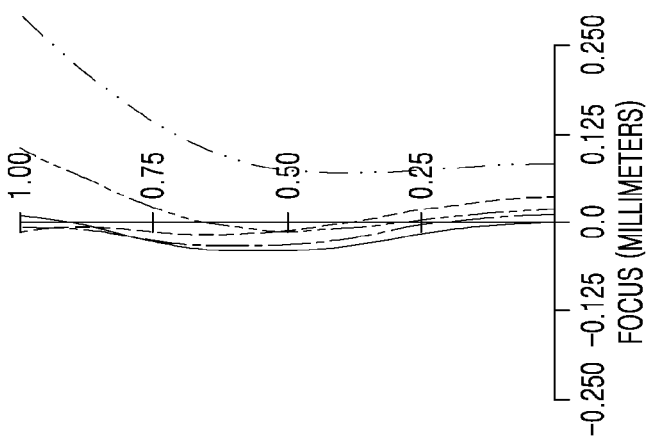

FIG. 13
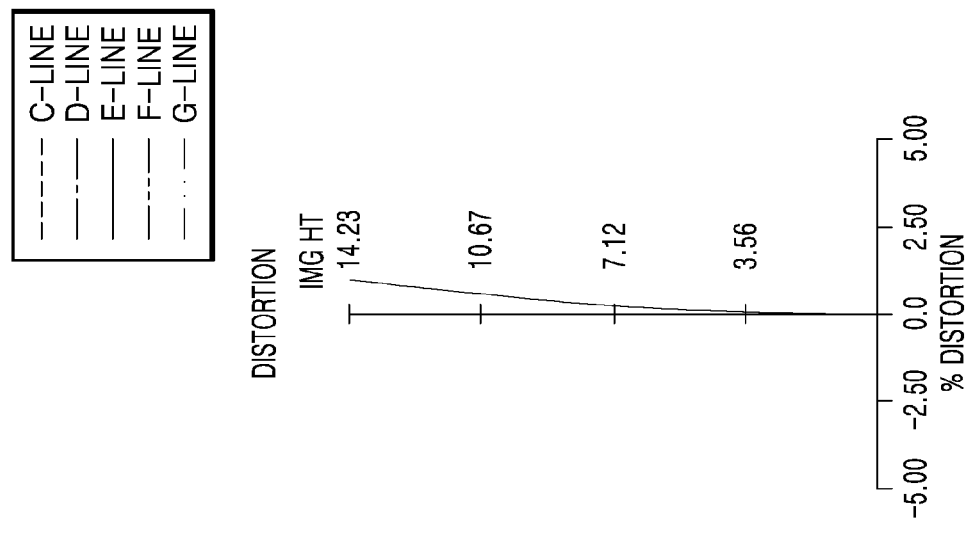
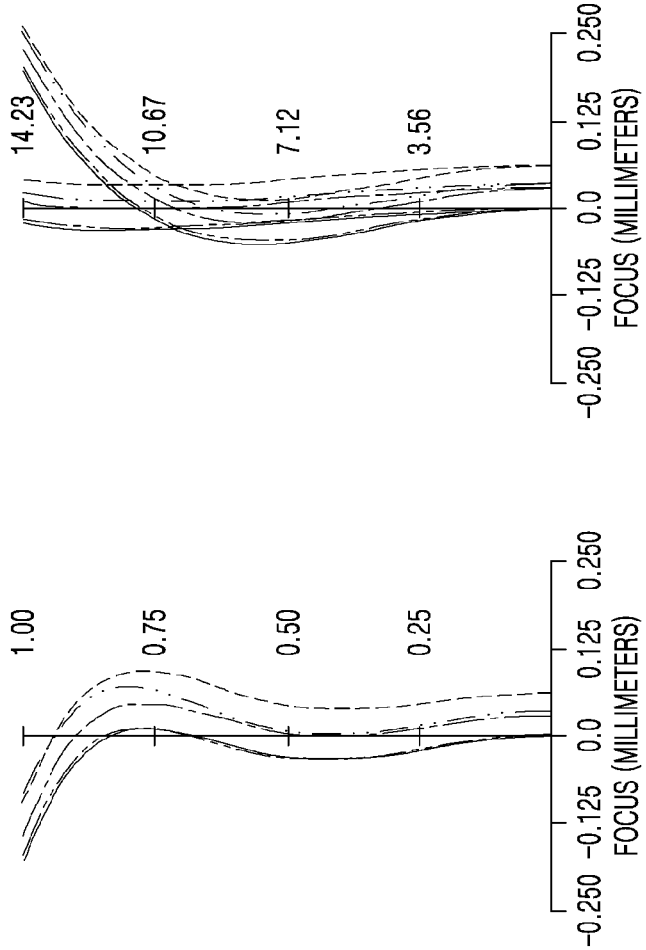

0.3° TELEPHOTO END IN VIBRATION PREVENTION STATE
(INFINITE OBJECT DISTANCE)

FIG. 16
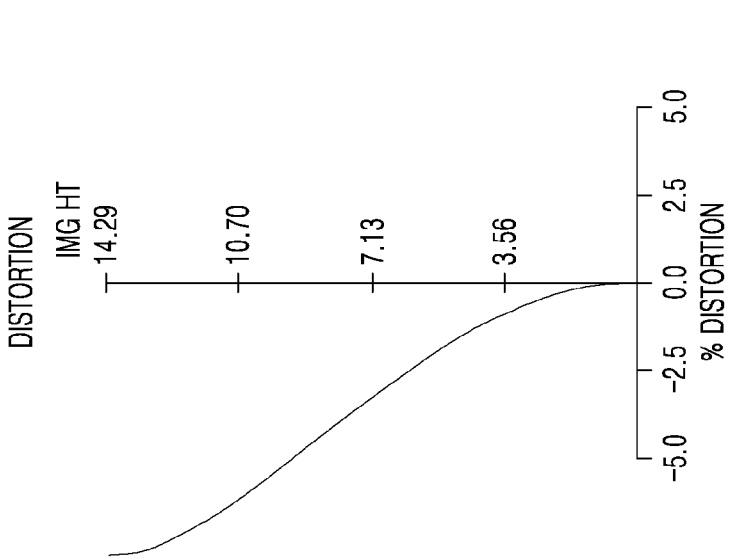
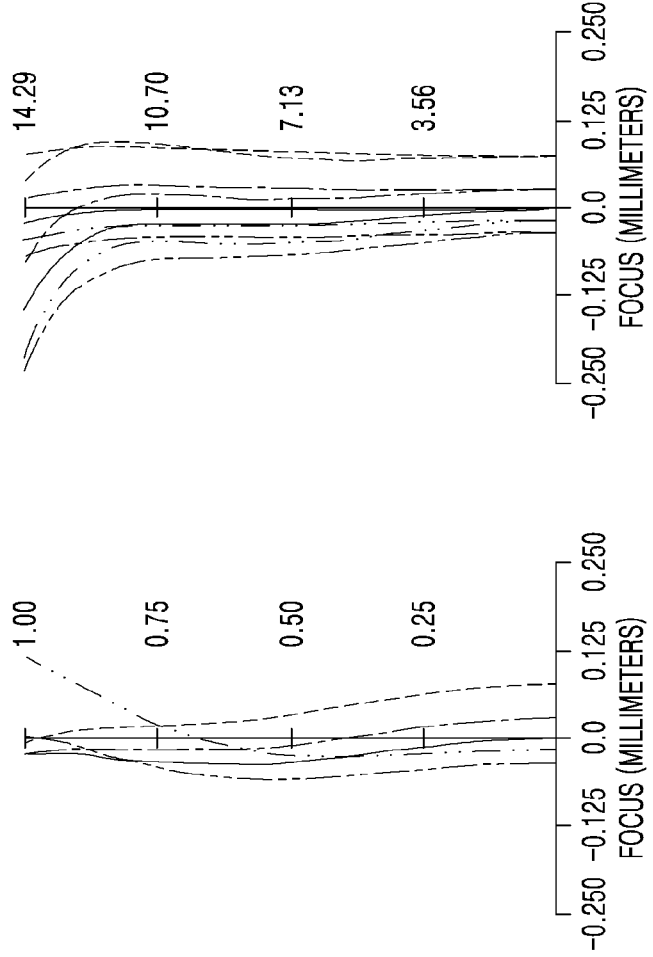

ZOOM LENS HAVING VIBRATION PREVENTION FUNCTION

CROSS REFERENCE TO RELATED PATENT APPLICATIONS

This application claims the priority benefit of Japanese Patent Application No. 2012-0268811, filed on Dec. 7, 2012, in the Japanese Patent Office and Korean Patent Application No. 10-2013-0082460, filed on Jul. 12, 2013, in the Korean Intellectual Property Office, the disclosures of which are incorporated herein in their entirety by reference.

BACKGROUND

1. Field

One or more embodiments of the invention relate to a zoom lens having a vibration prevention function and an electronic device using the zoom lens, and more particularly, to a zoom lens having a vibration prevention function which is used in, for example, a video camera, a digital camera, a mobile phone with a built-in camera, or a personal digital assistant.

2. Description of the Related Art

Various zoom lenses have been suggested which include a mechanism (vibration prevention mechanism) for compensating for image vibration due to unwanted vibration that is transmitted to a photographing system. For example, zoom lenses are known to compensate for image vibration due to vibration by moving some of the lens groups included in an optical system (zoom lens) in a direction perpendicular to an optical axis.

As one of such types of zoom lenses, a conventional zoom lens includes, in order from an object side to an image side, a first lens group having a positive refractive power, a second lens group having a negative refractive power, and a third lens group having a positive refractive power, in which the first lens group and the third lens group move toward the object side when zoom is changed from a wide angle end to a telephoto end, and which compensates for image vibration due to vibration by moving the second lens group in a direction perpendicular to an optical axis (for example, Japanese Patent Publication No. Hei 7-27977).

In addition, in the a conventional zoom lens, the second lens group includes two negative lens groups in order from the object side and compensates for image vibration due to vibration by moving the lens group of the two negative lens groups closer to the image side in a direction perpendicular to the optical axis (Japanese Patent Publication No. Hei 7-325272).

However, optical systems that have been recently suggested have a long focal length at the wide angle end. Accordingly, when an optical system uses a standard zoom lens including a wide angle area, an optical performance may not be satisfactorily designed.

SUMMARY

One or more embodiments of the invention include a zoom lens having a vibration prevention function and is made to be small in size by including a wide angle area to thereby secure a sufficient magnification (zoom) ratio and maintain a good optical performance.

Additional aspects will be set forth in part in the description which follows and, in part, will become apparent from the description, or may be learned by practicing the presented embodiments.

According to one or more embodiments, a zoom lens includes, sequentially from an object side, a first lens group having a positive refractive power, a second lens group having a negative refractive power, and a third lens group having a positive refractive power. When zoom is changed from a wide angle end to a telephoto end, an interval between the first lens group and the second lens group increases, and an interval between the second lens group and the third lens group decreases. The second lens group includes, sequentially from the object side, a second A lens group having a negative refractive power and a second B lens group having a negative refractive power, and the second B lens group is displaced in a direction perpendicular to an optical axis to perform a vibration prevention function.

The zoom lens may satisfy the following conditions:

$2.0 < f1/fw < 8.0$, and $3.0 < f2b/f2 < 10.0$, where, f1 denotes a focal length of the first lens group, f2 denotes a focal length of the second lens group, f2b denotes a focal length of the second B lens group, and fw denotes a focal length of the zoom lens at the wide angle end.

The zoom lens may further satisfy the following conditions:

$4.0 < f1/fw < 6.0$, and $5.0 < f2b/f2 < 9.0$.

The second A lens group may include, sequentially from the object side, a first negative lens, a second negative lens, and a positive lens, and the zoom lens may satisfy the following condition:

$1.5 < f2a/f2 < 5.0$, where, f2a denotes a focal length of the second A lens group.

The zoom lens may further satisfy the following condition:

$2.0 < f2a/f2 < 3.5$.

The zoom lens may satisfy the following conditions:

$0.03 < |f2|/ft < 0.25$, and $0.1 < f3/ft < 1.0$, where, f3 denotes the focal length of the third lens group, and ft denotes a focal length of the zoom lens at the telephoto end.

The zoom lens may further satisfy the following conditions:

$0.05 < |f2|/ft < 0.20$, and $0.2 < f3/ft < 0.8$.

The second A lens group and the second B lens group may move integrally when zoom is changed.

A lens surface of the second A lens group, which is closest to the object side, may be convex toward the object side.

The second A lens group may include, sequentially from the object side, a negative meniscus lens having a convex surface facing the object side, and a cemented lens including a negative biconcave lens and a positive biconvex lens, and the negative second B lens group may be configured as a cemented lens including a biconcave lens and a biconvex lens.

The second lens group may further include a second C lens group that is disposed on an image side of the second B lens group, and the second C lens group may be configured as a meniscus lens having a convex surface facing the image side.

The first lens group may include, sequentially from the object side, a cemented lens including a meniscus lens, which has a convex surface facing the object side, and a biconvex lens, and a meniscus lens having a convex surface facing the object side.

The third lens group may be configured as a cemented lens including a biconvex lens and a biconcave lens.

The zoom lens may further include a fourth lens group having a positive refractive power and is disposed on the image side of the third lens group.

When zoom is changed from the wide angle end to the telephoto end, an interval between the third lens group and the fourth lens group may decrease.

According to one or more embodiments, an electronic device includes the zoom lens, and an imaging element that receives an optical image formed by the zoom lens and converts the optical image into an electrical image signal.

According to one or more embodiments, a camera includes a housing, the zoom lens that is configured as an interchangeable lens and is detachably coupled to the housing, and an imaging element that is disposed in the housing, receives an optical image formed by the zoom lens, and converts the optical image into an electrical image signal.

BRIEF DESCRIPTION OF THE DRAWINGS

These and/or other aspects will become apparent and more readily appreciated from the following description of the embodiments, taken in conjunction with the accompanying drawings in which:

FIGS. 9 to 14 are aberration diagrams of the zoom lens illustrated in FIGS. 8A to 8C;

FIGS. 16 to 21 are aberration diagrams of the zoom lens illustrated in FIGS. 15A to 15C.

DETAILED DESCRIPTION

Figure 1A:
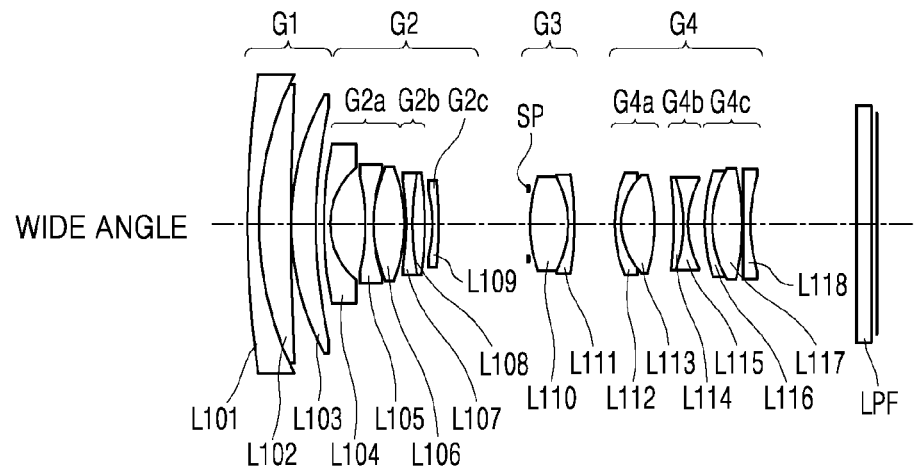
FIGS. 1A to 1C are cross-sectional views of a zoom lens, according to an embodiment.

Hereinafter, a zoom lens having a vibration prevention function will be described in detail with reference to the accompanying drawings. The same reference numerals in the drawings denote the same element. In the drawings, the thicknesses of layers and regions are exaggerated for clarity.

A zoom lens according to an embodiment may include, in order from an object side to an image side, a positive first lens group G1, a negative second lens group G2, and a positive third lens group G3. When zoom is changed from a wide angle end to a telephoto end, an interval between the positive first lens group G1 and the negative second lens group G2 may increase, and an interval between the negative second lens group G2 and the positive third lens group G3 may decrease. In addition, the second lens group G2 may include a negative second A lens group G2a and a negative second B lens group G2b in order from the object side. The second B lens group G2b is displaced or moved in a direction perpendicular to an optical axis to prevent vibration. And the second lens group G2 may satisfy the following conditions:

$$2.0 < f1/fw < 8.0 \quad \text{(Condition 1)}$$

$$3.0 < f2b/f2 < 10.0 \quad \text{(Condition 2)}$$

where, fi denotes a focal length of an i-th lens group, f2b denotes a focal length of the negative second B lens group G2b, and fw denotes a focal length of the zoom lens at a wide angle end.

Condition 1 is a condition for appropriately setting a focal length of the positive first lens group G1. When the ratio exceeds the upper limit, a bright Fno (F number) may not be secured at a telephoto end. When the ratio is less than the lower limit, a diameter of a foremost lens (i.e., a lens closest to the object side) may not be reduced, which is not preferable. Condition 2 is a condition for appropriately setting a focal length of the negative second B lens group G2b. When the ratio exceeds the upper limit, an amount of movement of the second B lens group G2b excessively increases when preventing vibration. When the ratio is less than the lower limit, a vibration affecting optical performance, particularly, at the telephoto end may not be satisfactorily corrected.

Numerical ranges of Conditions 1 and 2 may be preferably set as follows:

$$4.0 < f1/fw < 6.0 \quad \text{(Condition 1a)}$$

$$5.0 < f2b/f2 < 9.0 \quad \text{(Condition 2a)}$$

In addition, in the current embodiment, the negative second A lens group G2a includes a first negative lens L104, a second negative lens L105, and a positive lens L106 in order from the object side, and may satisfy the following condition:

$$1.5 < f2a/f2 < 5.0 \quad \text{(Condition 3)}$$

where, f2a denotes a focal length of the negative second A lens group G2a.

Since the negative second A lens group G2a has two negative lenses sequentially from the object side, an off-axis light beam may be gently refracted, particularly, at the wide angle end, and the correction of negative distortion aberration is facilitated. In addition, since the negative second A lens group G2a has the positive lens on the image side, the correction of spherical aberration at the telephoto end is facilitated. Condition 3 is a condition for appropriately setting the focal length of the negative second A lens group G2a. When the ratio exceeds the upper limit, an entrance pupil becomes excessively far from the first lens group G1 toward the image side, and consequently, it is difficult to reduce a diameter of the foremost lens. When the ratio is less than the lower limit, it is difficult to correct negative distortion aberration or field curvature of the zoom lens at the wide angle end, which is not preferable.

A numerical range of Condition 3 may be preferably set as follows:

$$2.0 < f2a/f2 < 3.5 \quad \text{(Condition 3a)}$$

In addition, according to the current embodiment, the following conditions may be satisfied:

$$0.03 < |f2|/ft < 0.25 \quad \text{(Condition 4)}$$

$$0.1 < f3/ft < 1.0 \quad \text{(Condition 5)}$$

where, fi denotes a focal length of the i-th lens group, and ft denotes a focal length of the entire zoom lens system at the telephoto end.

Condition 4 is a condition for appropriately setting a focal length of the negative second lens group G2. When the ratio exceeds the upper limit, a magnification (zoom) ratio may not be secured, and thus it is difficult to correct negative distortion aberration or field curvature of the zoom lens at the wide angle end, which is not preferable. Condition 5 is a condition for appropriately setting a focal length of the positive third lens group G3. When the ratio exceeds the upper limit, a magnification (zoom) ratio may not be secured. When the ratio is less than the lower limit, it is difficult to correct spherical aberration of the zoom lens at the telephoto end.

Numerical ranges of Conditions 4 and 5 may be preferably set as follows:

$$0.05 < |f2|/ft < 0.20 \quad \text{(Condition 4a)}$$

$$0.2 < f3/ft < 0.8 \quad \text{(Condition 5a)}$$

In addition, according to the current embodiment, the negative second A lens group G2a and the negative second B lens group G2b may be moved integrally (together) when zoom is changed. When the negative second A lens group G2a and the negative second B lens group G2b are moved integrally when zoom is changed, a driving mechanism may be simplified, and thus it is easy to reduce the size of a driving device. In addition, in the negative second A lens group G2a, a lens surface that is closest to the object side may be convex toward the object side. When the lens surface of the negative second A lens group G2a, which is closest to the object side, is a surface that is convex toward the object side, the correction of negative distortion aberration or field curvature of the zoom lens at the wide angle end may be facilitated.

EMBODIMENTS

Hereinafter, first to third embodiments of the invention (FIGS. 1A-1C, 8A-8C, 15A-15C) will be described.

Table 1 shows the correspondence between the first to third embodiments and the above-mentioned conditions.

TABLE 1

|  | First Embodiment | Second Embodiment | Third Embodiment |
|---|---|---|---|
| f1/fw | 4.950 | 4.968 | 4.722 |
| f2b/f2 | 7.172 | 7.107 | 6.935 |
| f2a/f2 | 2.878 | 2.876 | 2.276 |
| |f2|/ft | 0.160 | 0.161 | 0.166 |
| f3/ft | 0.542 | 0.546 | 0.676 |

In each numerical embodiment, surface number i denotes an optical surface in an order from the object side. Ri denotes a radius of curvature of an i-th optical surface, Di denotes an interval between an i-th surface and an i+1-th surface, ndi and vdi respectively denote a refractive index and an Abbe number of an i-th optical member material with respect to d-line. A unit of length is mm. Furthermore, "Aperture" denotes an aperture stop SP, and "Plane" denotes a surface of a low pass filter LPF.

An aspherical shape of the lens in each embodiment may be expressed by Expression 1 below. In Expression 1 below, when an axial direction is an x-axis, a direction perpendicular to the optical direction is y, and a traveling direction of a light beam is a positive direction, x denotes a distance from the vertex of the lens in the optical axis (x-axis) direction, h denotes a distance in a direction (y-axis) perpendicular to the optical axis, K denotes a conic constant, $A_4$, $A_6$, $A_8$, and $A_{10}$ denote aspherical coefficients, and c denotes an inverse of a radius of curvature (1/R) at the vertex of the lens.

$$x = \frac{Ch^2}{1+\sqrt{1-(1+K)C^2h^2}} + A_4h^4 + A_6h^6 + A_8h^8 + A_{10}h^{10} \quad (1)$$

In addition, for example, the notation of "E-Z" denotes "$10^{-z}$".

First Embodiment

Figure 1B:
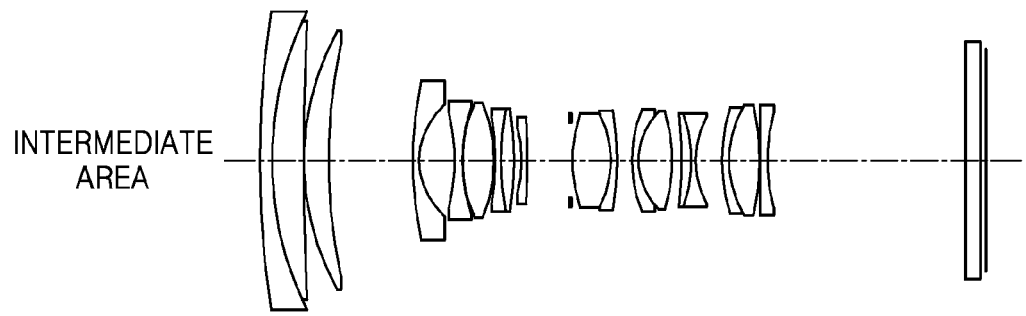
Figure 1C:
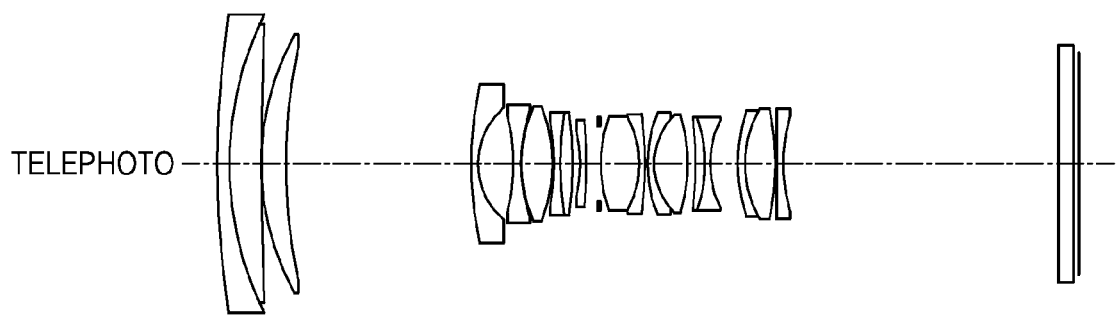
Figure 2:
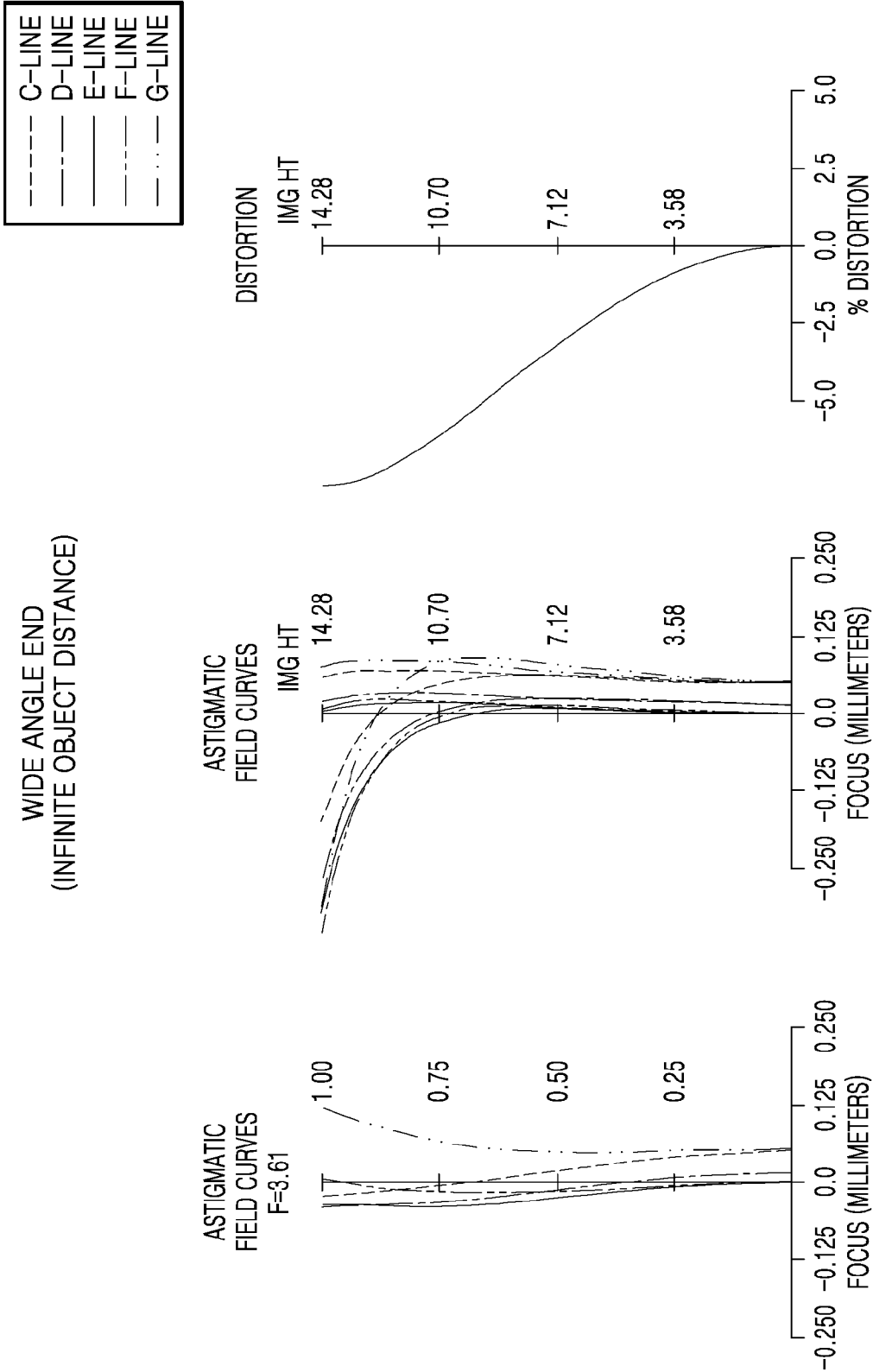
FIGS. 2 to 7 are aberration diagrams of the zoom lens illustrated in FIGS. 1A to 1C.

Table 2 shows surface data a zoom lens of a first embodiment (FIGS. 1A-1C).

TABLE 2

|  |  | R | D | nd | vd |
|---|---|---|---|---|---|
|  | 1 | 173.9428 | 2.00 | 1.8467 | 23.8 |
|  | 2 | 58.9194 | 5.88 | 1.7292 | 54.7 |
|  | 3 | 800.0000 | 0.15 |  |  |
|  | 4 | 45.9360 | 4.49 | 1.8042 | 46.5 |
|  | 5 | 107.7895 | D1 |  |  |
|  | 6 | 70.2766 | 1.30 | 1.8810 | 40.2 |
|  | 7 | 12.8415 | 6.48 |  |  |
| Aspherical Surface | 8 | −37.8263 | 1.30 | 1.8047 | 40.9 |
|  | 9 | 29.6180 | 0.15 |  |  |
|  | 10 | 24.0669 | 5.23 | 1.8467 | 23.8 |
|  | 11 | −31.3963 | 0.55 |  |  |
|  | 12 | −45.3466 | 0.90 | 1.8348 | 42.7 |
|  | 13 | 56.6832 | 2.17 | 1.7408 | 27.8 |
|  | 14 | −86.3238 | 1.57 |  |  |
|  | 15 | −28.2362 | 1.00 | 1.8348 | 42.7 |
|  | 16 | −78.9027 | D2 |  |  |
|  | 17 | Aperture | 0.48 |  |  |
| Aspherical Surface | 18 | 24.1522 | 6.09 | 1.5832 | 59.2 |
|  | 19 | −20.2804 | 1.00 | 1.7618 | 26.6 |
|  | 20 | −89.6321 | D3 |  |  |
|  | 21 | 21.9139 | 1.83 | 1.8348 | 42.7 |
|  | 22 | 11.8934 | 6.24 | 1.5892 | 60.6 |
| Aspherical Surface | 23 | −24.7778 | D4 |  |  |
|  | 24 | −58.5945 | 1.65 | 1.7618 | 26.6 |
|  | 25 | −26.1151 | 0.80 | 1.5174 | 52.2 |
|  | 26 | 18.1087 | D5 |  |  |
| Aspherical Surface | 27 | 31.5769 | 1.30 | 1.7391 | 49.0 |
|  | 28 | 19.1493 | 5.41 | 1.4970 | 81.6 |
|  | 29 | −43.5041 | 0.15 |  |  |
|  | 30 | 400.0000 | 1.50 | 1.5955 | 39.2 |
|  | 31 | 44.7291 | D6 |  |  |
|  | 32 | Plane | 2.00 | 1.5168 | 64.2 |
|  | 33 | Plane | 1.00 |  |  |

Table 3 shows data regarding variable distances (D1, D2, D3, D4, D5, and D6) during zooming by the zoom lens of the first embodiment at the wide angle end, the intermediate position, and the telephoto end.

TABLE 3

|  | f = 16.5 | f = 30.0 | f = 77.6 |
|---|---|---|---|
| D1 | 1.20 | 15.40 | 33.52 |
| D2 | 16.39 | 7.96 | 2.42 |
| D3 | 7.50 | 2.77 | 0.50 |
| D4 | 3.44 | 1.90 | 1.40 |
| D5 | 3.52 | 5.06 | 5.56 |
| D6 | 19.41 | 35.78 | 49.48 |

Table 4 shows aspherical coefficients of the aspherical lens surfaces in the zoom lens of the first embodiment.

TABLE 4

| | Aspherical Coefficient | | | | | |
|---|---|---|---|---|---|---|
| | R | K | A4 | A6 | A8 | A10 |
| R8 | −37.8263 | 0.0 | 1.2129E−06 | −2.7093E−06 | 0.0 | 0.0 |
| R18 | 24.1522 | 0.0 | −1.2809E−06 | −5.0248E−06 | 0.0 | 0.0 |
| R23 | −24.7778 | 0.0 | 4.5394E−06 | −1.3931E−06 | 0.0000E+00 | 0.0 |
| R27 | 31.5769 | 0.0 | 9.6493E−06 | −4.5691E−06 | 3.7488E−10 | 0.0 |

FIGS. 1A to 1C are cross-sectional views of a zoom lens according to the first embodiment. Here, FIGS. 1A to 1C illustrate the zoom lens at a wide angle end, an intermediate area (position), and a telephoto end, respectively. A configuration of the zoom lens of the first embodiment will be briefly described with reference to FIG. 1A.

The zoom lens according to the first embodiment may include, in order from the object side, a first lens group G1 having a positive refractive power, a second lens group G2 having a negative refractive power, a third lens group G3 having a positive refractive power, and a fourth lens group G4 having a positive refractive power. The first lens group G1 may include, in order from the object side, a cemented lens including a meniscus lens L101 having a convex surface facing the object side and a biconvex lens L102, and a meniscus lens L103 having a convex surface facing the object side.

The second lens group G2 includes, in order from the object side, a negative second A lens group G2a, a negative second B lens group G2b, and a second C lens group G2c on the image side of the negative second B lens group G2b. The negative second B lens group G2b is displaced or moved in a direction perpendicular to the optical axis to prevent vibration. The negative second A lens group G2a may include, in order from the object side, a meniscus lens L104 which is a negative lens having a convex surface on the object side thereof, a biconcave lens L105 which is a negative lens, and a biconvex lens L106 which is a positive lens. The negative biconcave lens L015 and the positive biconvex lens L106 may be configured as a cemented lens. The negative second B lens group G2b may be configured as a cemented lens including a biconcave lens L107 and a biconvex lens L108. The second C lens group G2c may be configured as a meniscus lens L109 having a convex surface facing the image side.

An aperture stop SP is disposed on the object side of the third lens group G3. The third lens group G3 may be configured as a cemented lens including biconvex lens L110 and a biconcave lens L111.

The fourth lens group G4 includes, in order from the object side, a positive fourth A lens group G4a, a negative fourth B lens group G4b, and a positive fourth C lens group G4c. The fourth A lens group G4a may be configured as a cemented lens including a meniscus lens L112, which has a convex surface facing the object side, and a biconvex lens L113. The negative fourth B lens group G4b may be configured as a cemented lens including a meniscus lens L114, which has a convex surface facing the image side, and a biconcave lens L115. The positive fourth C lens group G4c may be configured to include a meniscus lens L116, which has a convex surface facing the object side, a biconvex lens L117, and a meniscus lens L118 which has a convex surface facing the object side. The zoom lens may include an optical filter, e.g., low pass filter LPF, disposed on the image side of the fourth lens group G4.

In addition, when zoom is changed from the wide angle end to the telephoto end, an interval between the positive first lens group G1 and the negative second lens group G2 may increase, an interval between the negative second lens group G2 and the positive third lens group G3 may decrease, and an interval between the positive third lens group G3 and the positive fourth lens group G4 may decrease. In addition, the negative fourth B lens group G4b may be moved toward the image side so as to perform focusing at close range.

Figure 3:
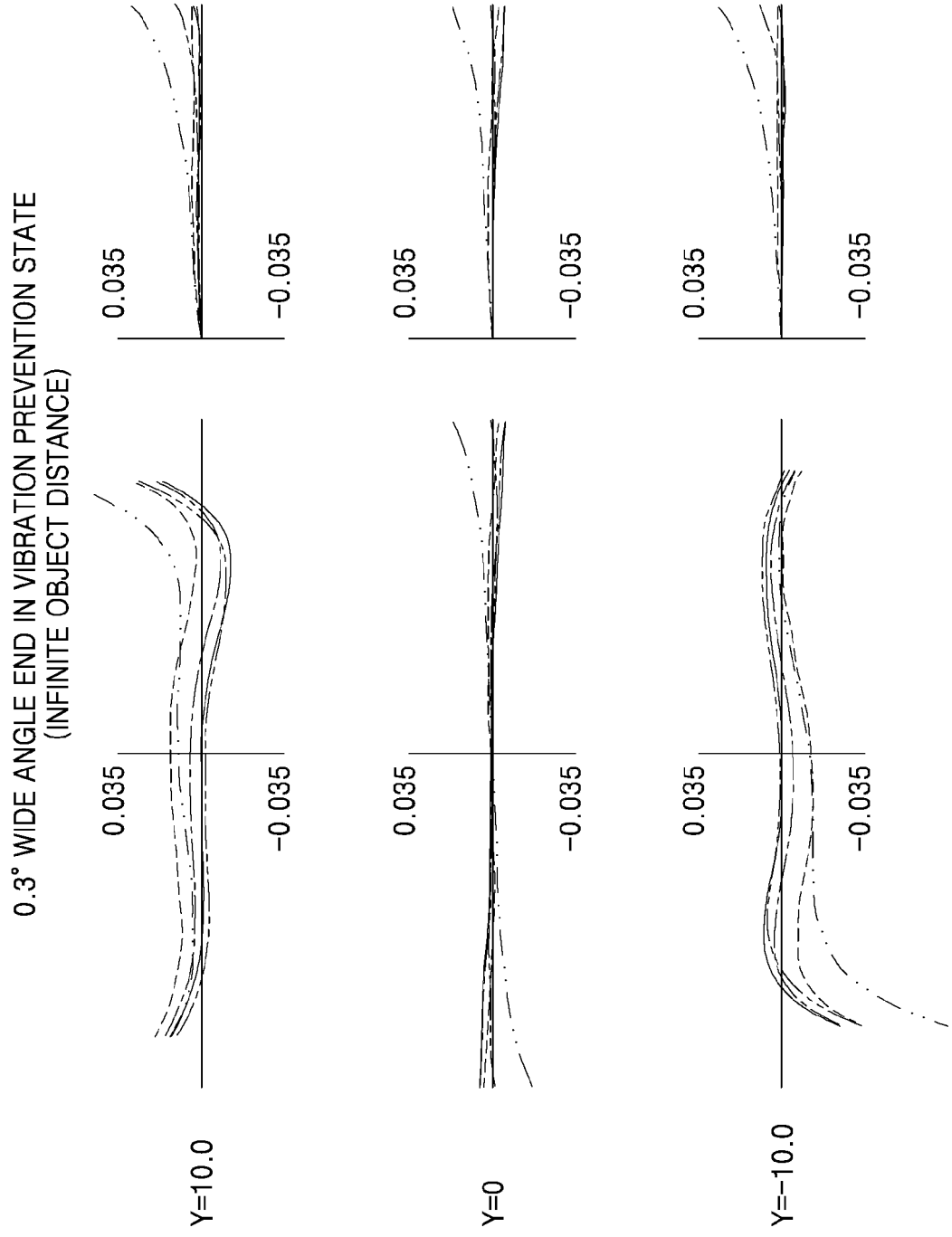
Figure 4:
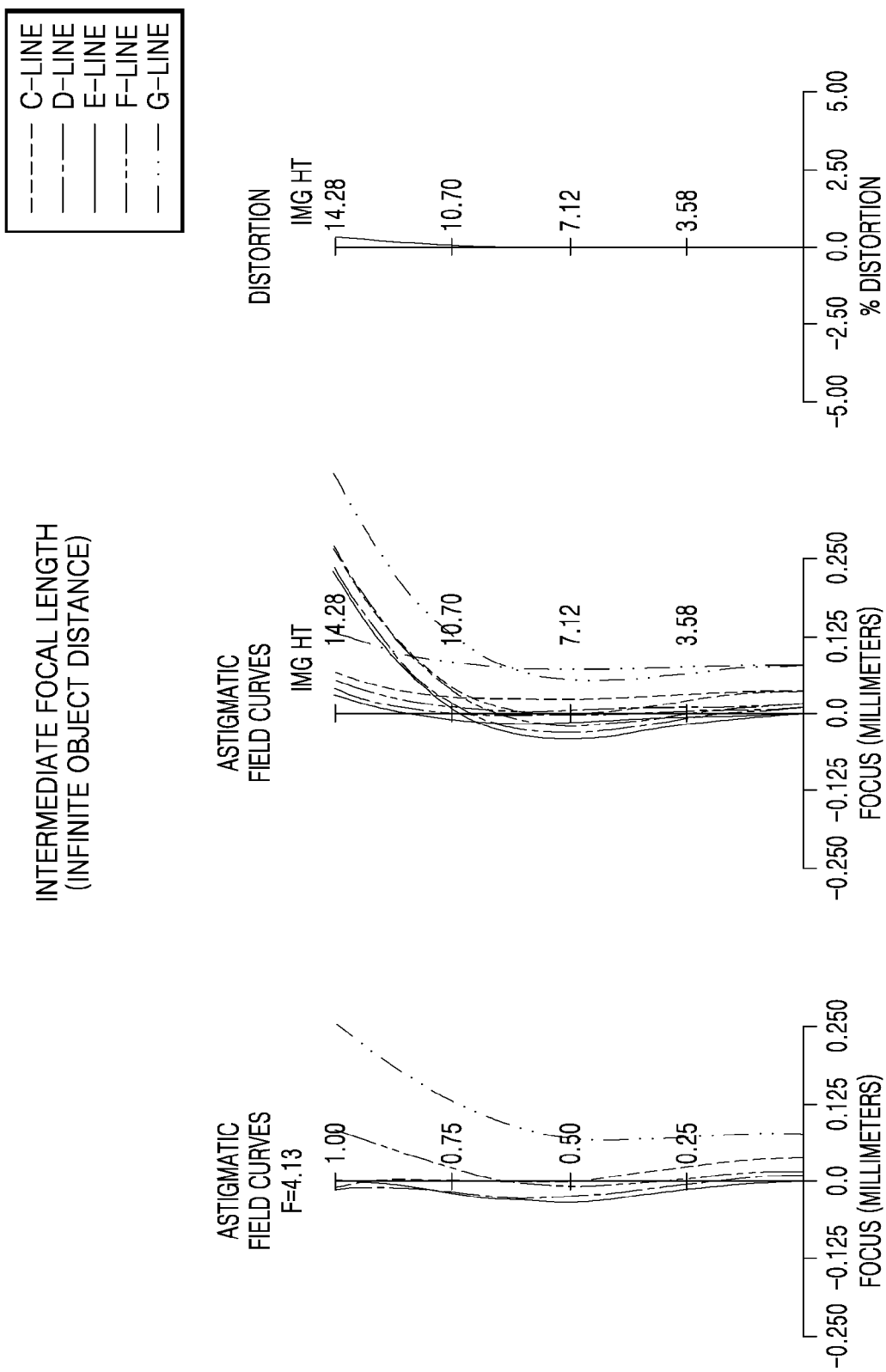
Figure 5:
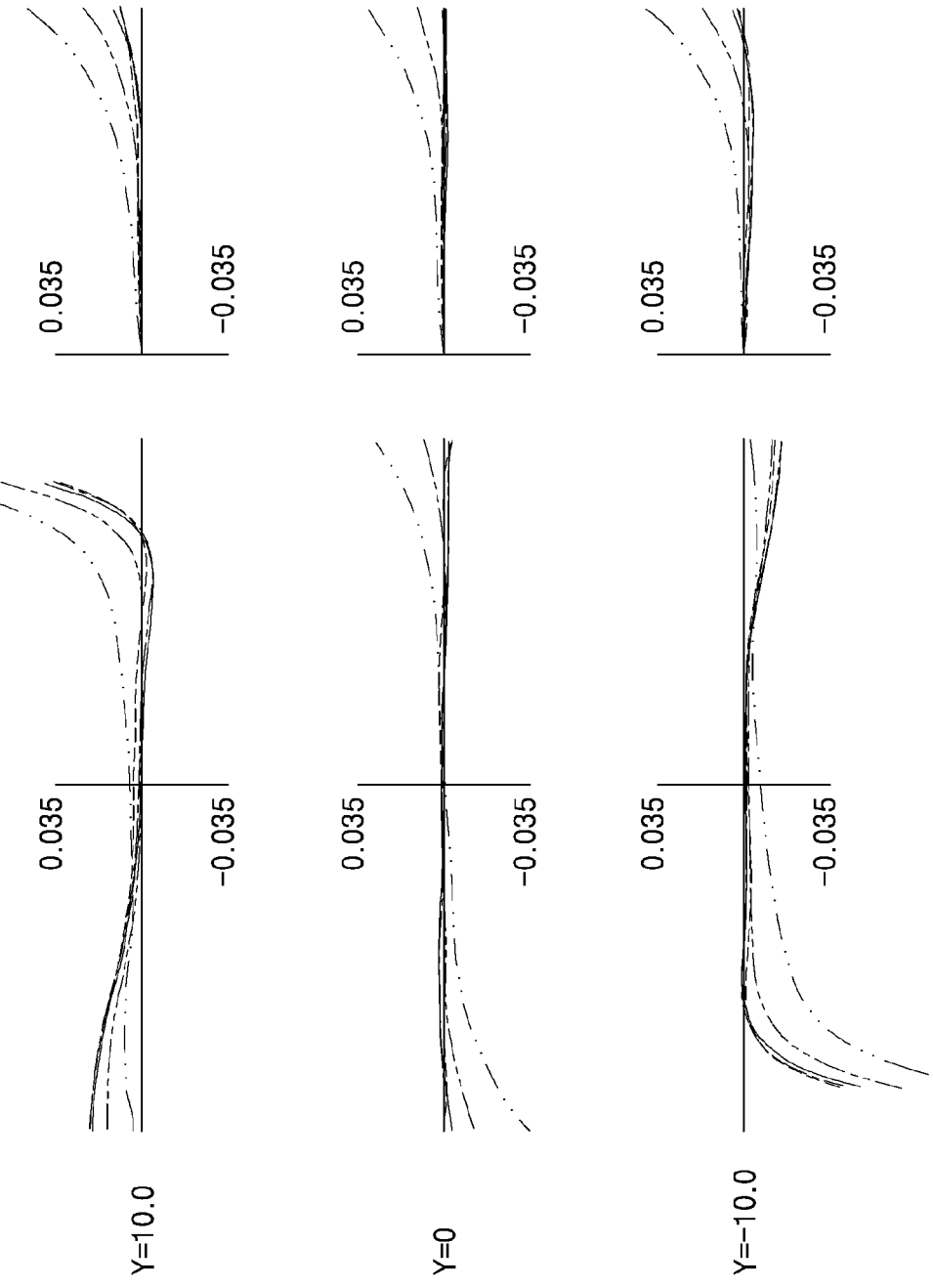
Figure 6:
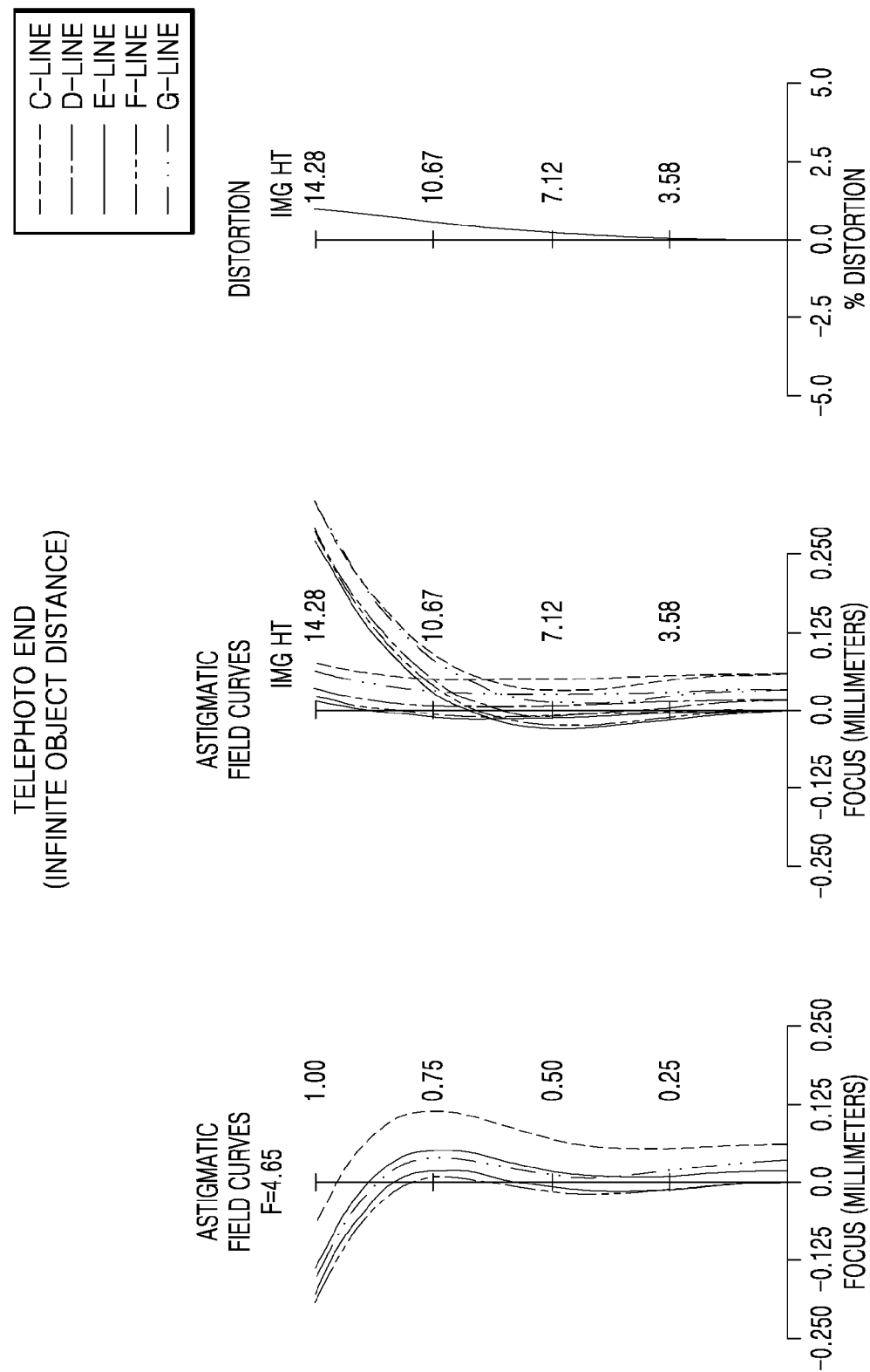
Figure 7:
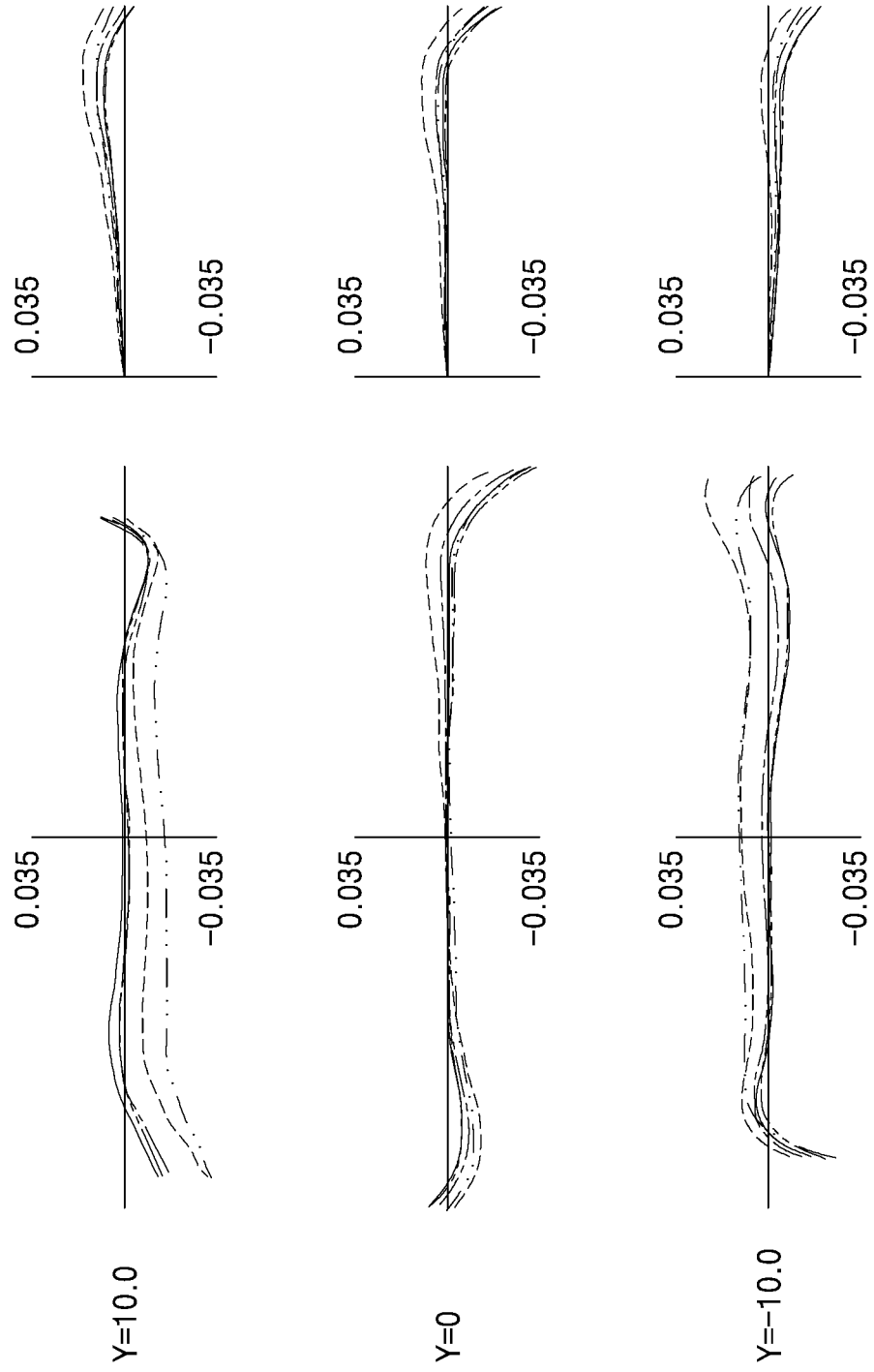

FIGS. 2 to 7 illustrate aberration diagrams of the zoom lens of the first embodiment. In each of the aberration diagrams illustrated in FIGS. 2, 4, and 6, spherical aberration, astigmatic aberration, and distortion aberration are sequentially shown from the left, and each aberration is calculated on the assumption that an object is at infinity. In addition, a horizontal axis of the astigmatic aberration indicates amounts of deviation X1 to X5 (mm) of a spherical imaging point and amounts of deviation Y1 to Y5 (mm) of a meridional imaging point from a paraxial image plane. FIGS. 3, 5, and 7 are horizontal aberration diagrams when vibration is prevented.

Second Embodiment

Figure 8A:
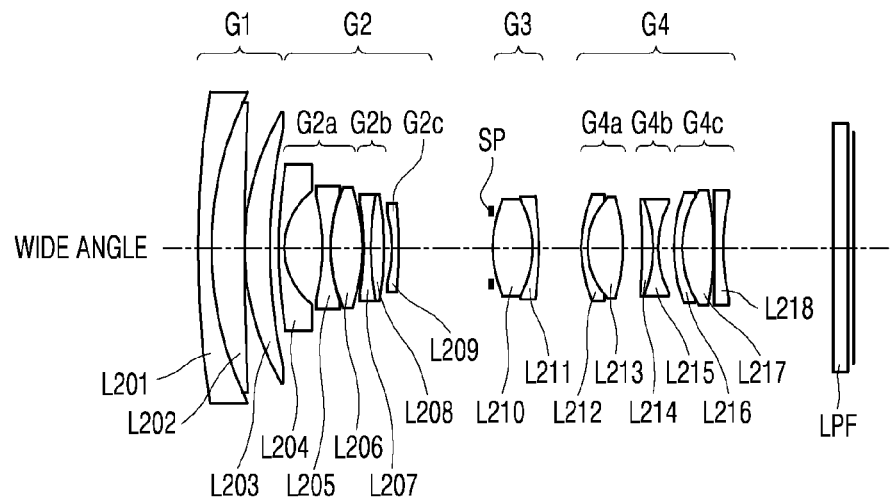
FIGS. 8A to 8C are cross-sectional views of a zoom lens, according to another embodiment.
Figure 8B:
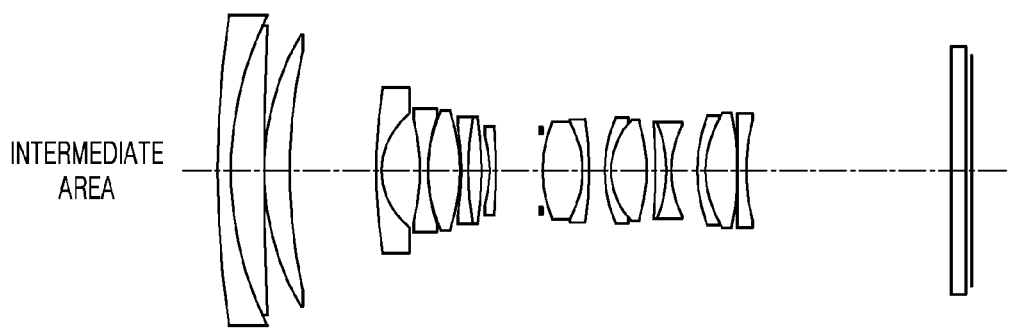
Figure 8C:
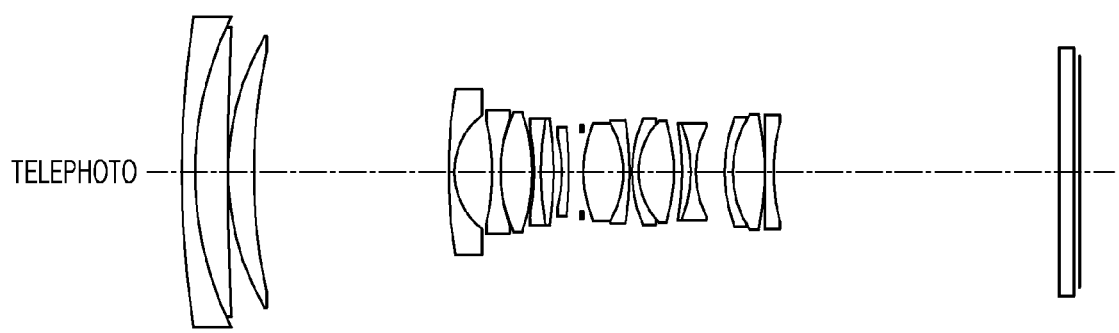
Figure 9:
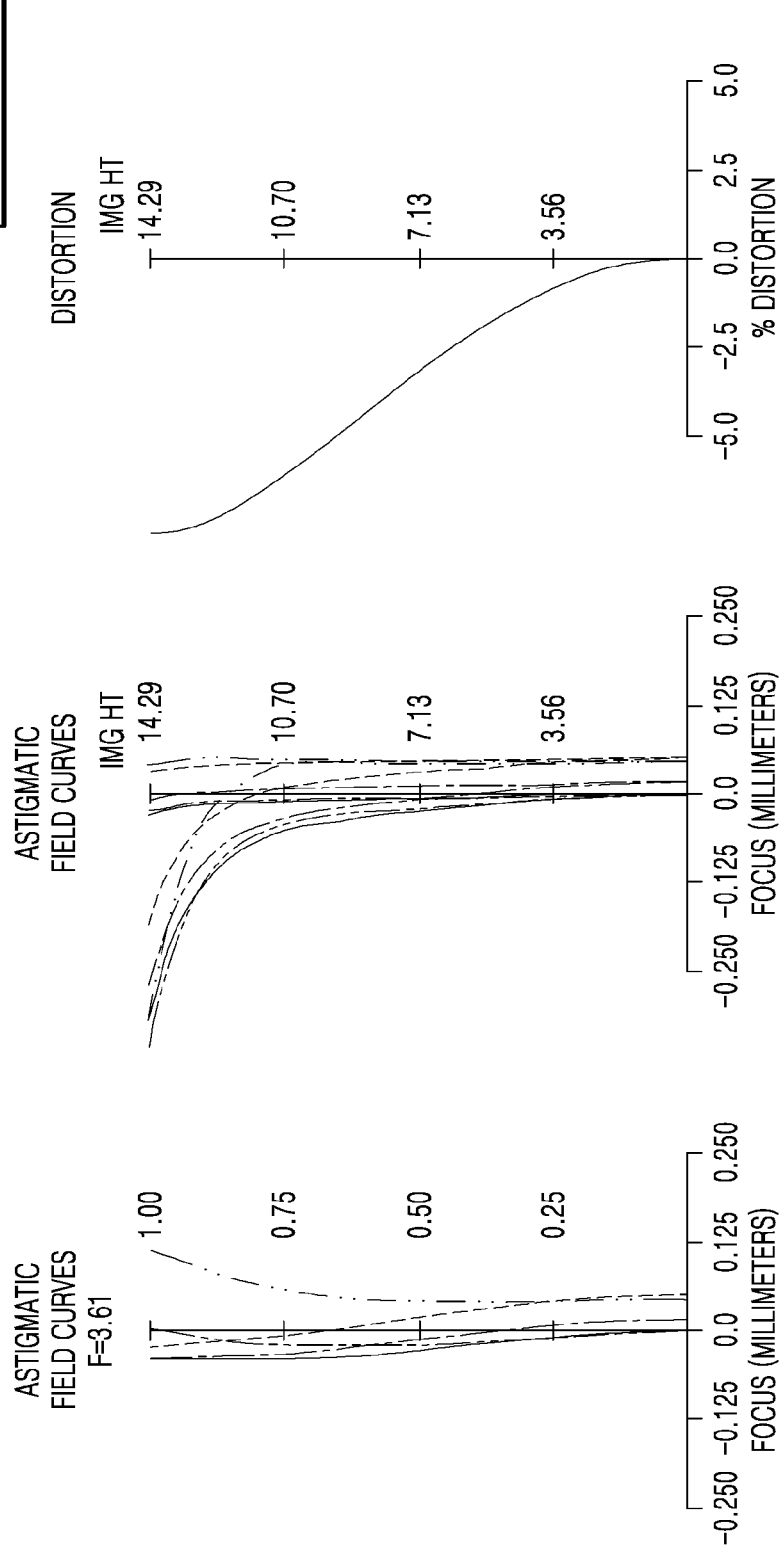
Figure 10:
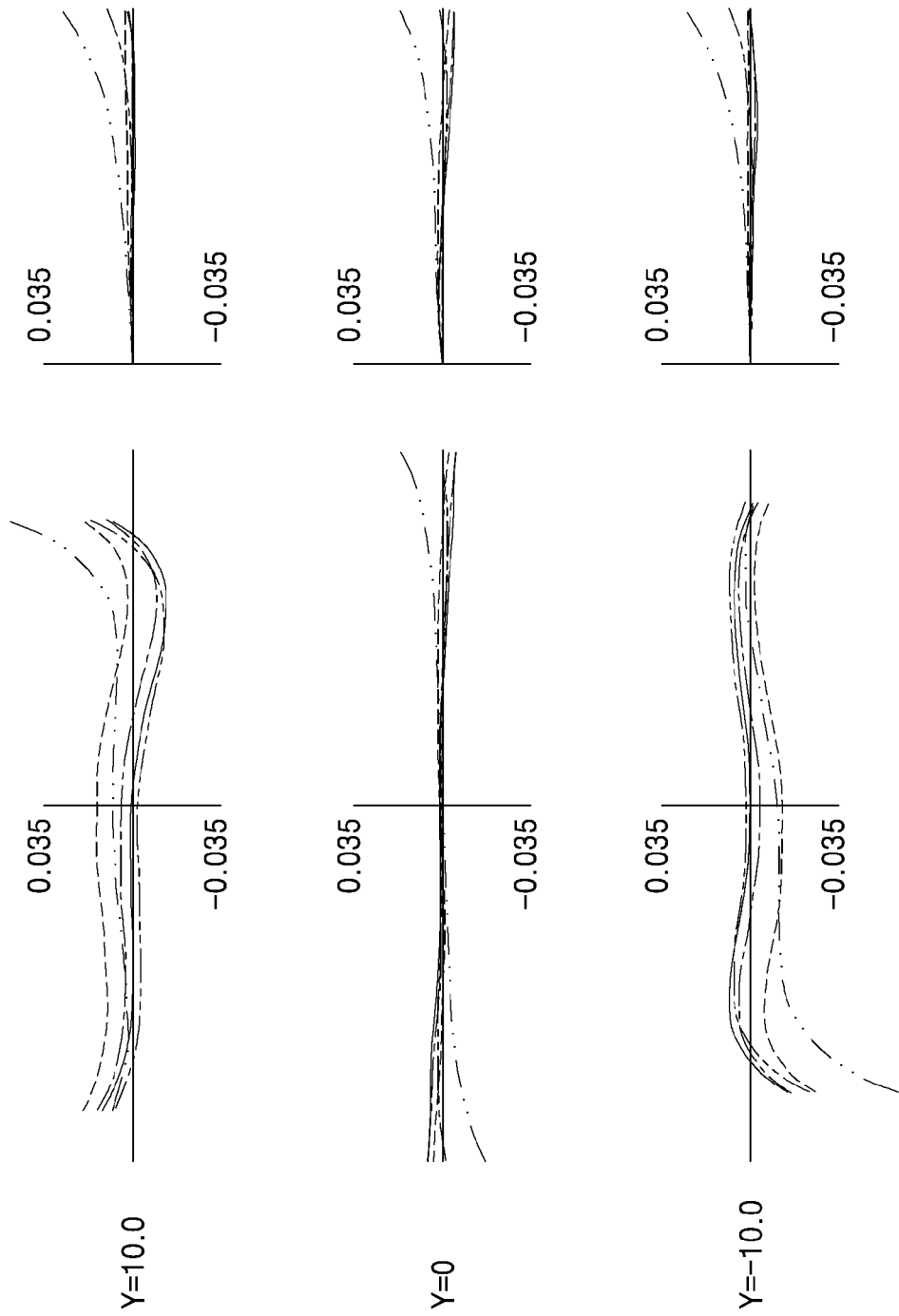
Figure 12:
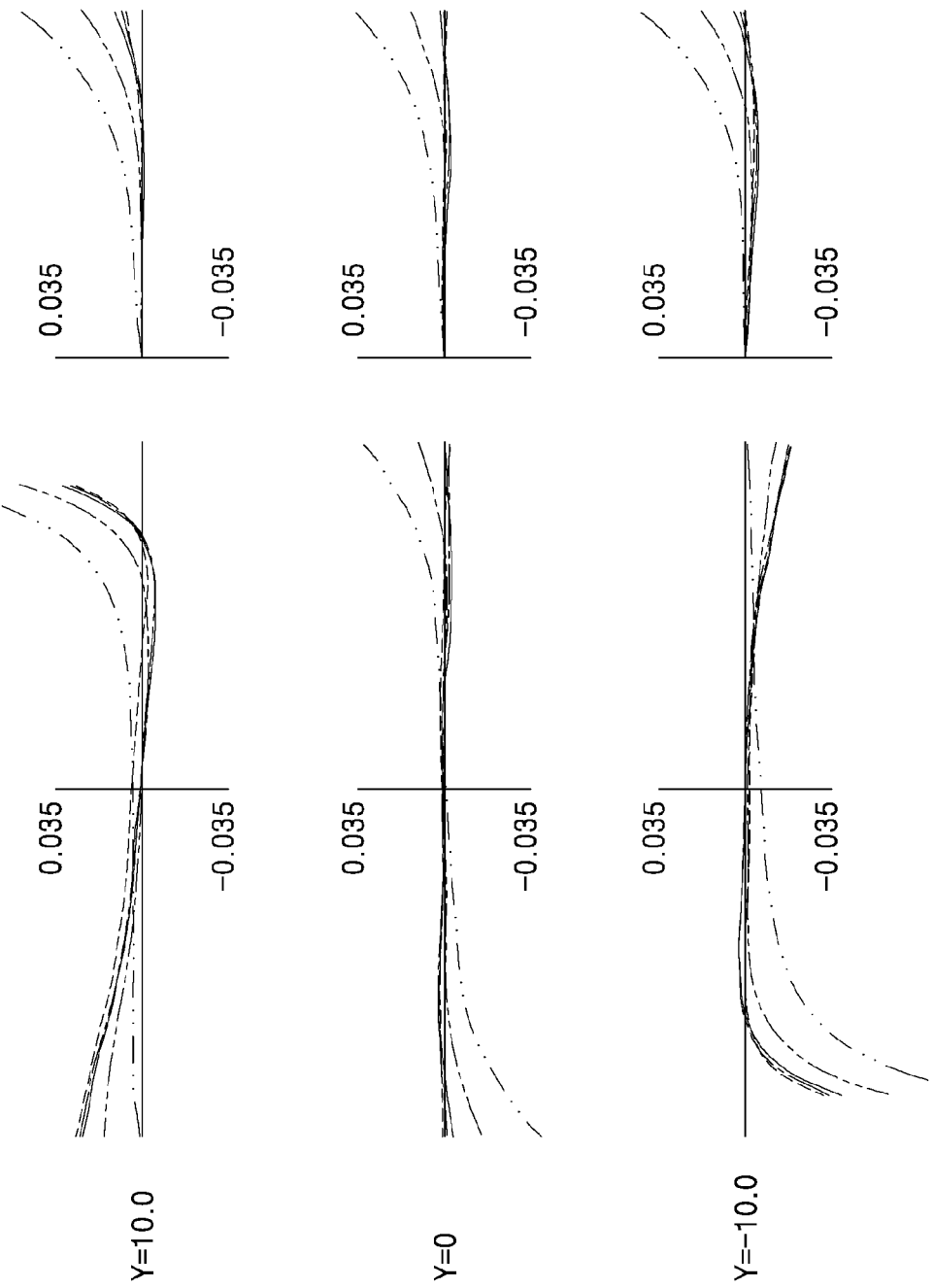
Figure 14:
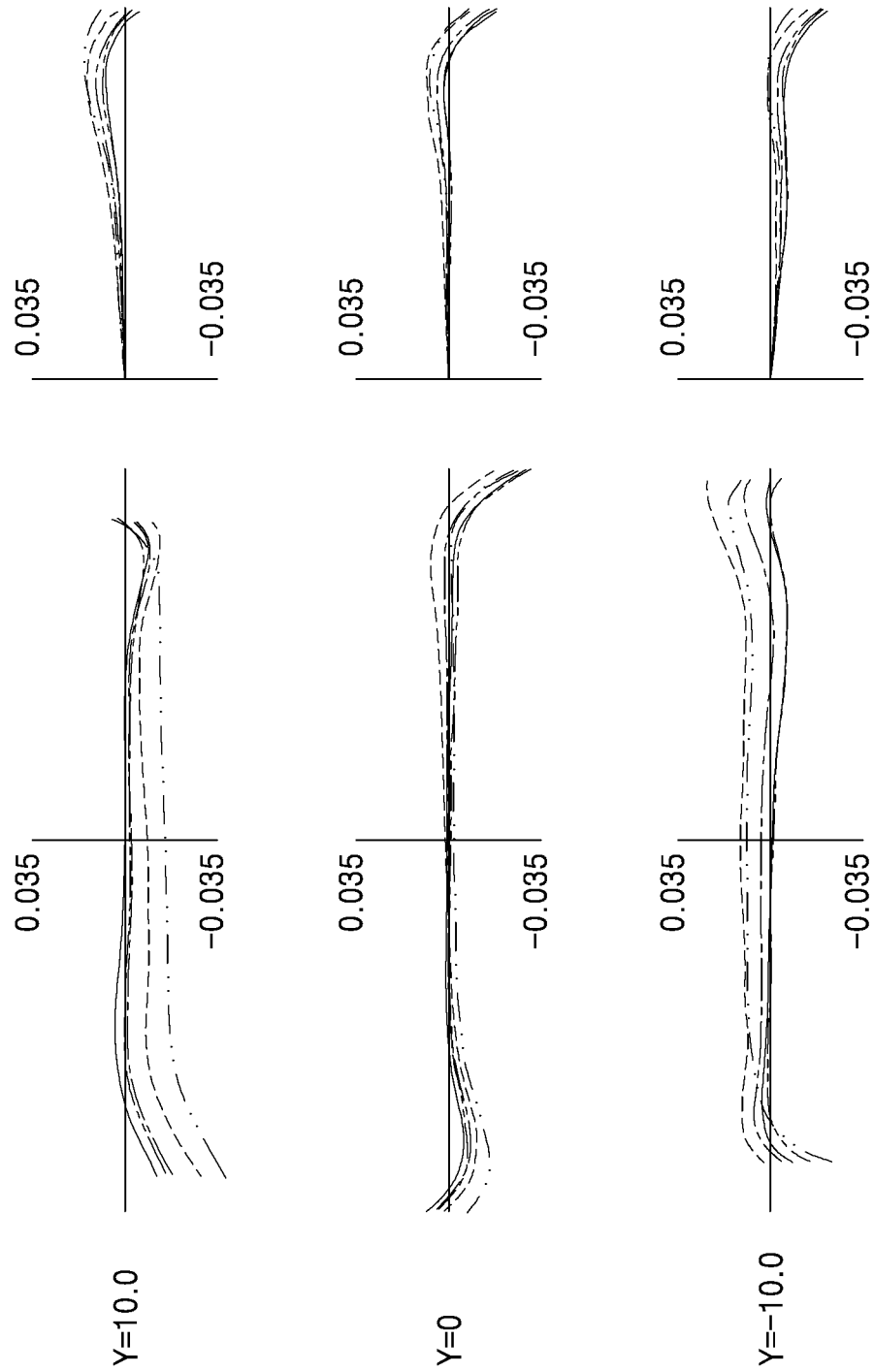

Table 5 shows surface data of a zoom lens of a second embodiment (FIGS. 8A-8C).

TABLE 5

| | | R | D | nd | vd |
|---|---|---|---|---|---|
| | 1 | 173.5633 | 2.00 | 1.8467 | 23.8 |
| | 2 | 59.5800 | 5.84 | 1.7292 | 54.7 |
| | 3 | 800.0000 | 0.15 | | |
| | 4 | 45.8679 | 4.49 | 1.8042 | 46.5 |
| | 5 | 107.1811 | D1 | | |
| | 6 | 69.4232 | 1.30 | 1.8810 | 40.2 |
| | 7 | 12.9133 | 6.48 | | |
| Aspherical Surface | 8 | −37.3819 | 1.30 | 1.8047 | 40.9 |
| | 9 | 29.0909 | 0.15 | | |
| | 10 | 24.0012 | 5.40 | 1.8467 | 23.8 |
| | 11 | −31.1639 | 0.55 | | |
| | 12 | −44.9611 | 0.90 | 1.8348 | 42.7 |
| | 13 | 59.2807 | 2.20 | 1.7283 | 28.3 |
| | 14 | −82.5355 | 1.63 | | |
| | 15 | −25.9427 | 1.00 | 1.8348 | 42.7 |
| | 16 | −62.3182 | D2 | | |
| | 17 | Aperture | 0.50 | | |
| Aspherical Surface | 18 | 24.7896 | 6.83 | 1.5832 | 59.2 |
| | 19 | −18.7537 | 1.00 | 1.7552 | 27.5 |
| | 20 | −80.5712 | D3 | | |
| | 21 | 22.3804 | 1.00 | 1.8348 | 42.7 |
| | 22 | 12.2727 | 6.09 | 1.5892 | 60.6 |
| Aspherical Surface | 23 | −24.6483 | D4 | | |
| | 24 | −61.8525 | 1.70 | 1.7283 | 28.3 |
| | 25 | −26.3387 | 0.80 | 1.5174 | 52.2 |
| | 26 | 18.0539 | D5 | | |
| Aspherical Surface | 27 | 27.8216 | 1.30 | 1.7391 | 49.0 |
| | 28 | 18.0552 | 5.49 | 1.4970 | 81.6 |
| | 29 | −43.8221 | 0.15 | | |
| | 30 | 390.0028 | 1.50 | 1.6584 | 50.9 |
| | 31 | 40.5345 | D6 | | |
| | 32 | Plane | 2.00 | 1.5168 | 64.2 |
| | 33 | Plane | 1.00 | | |

Table 6 shows data regarding a variable distance during zooming by the zoom lens of the second embodiment at the wide angle end, the intermediate position, and the telephoto end.

TABLE 6

|    | f = 16.5 | f = 30.0 | f = 77.6 |
|----|----------|----------|----------|
| D1 | 1.20     | 14.90    | 33.65    |
| D2 | 15.99    | 7.86     | 2.22     |
| D3 | 7.49     | 2.75     | 0.50     |
| D4 | 3.56     | 1.90     | 1.40     |
| D5 | 2.95     | 4.60     | 5.10     |
| D6 | 18.73    | 34.88    | 48.54    |

Table 7 shows aspherical coefficients of the aspherical lens surfaces in the zoom lens of the second embodiment.

TABLE 7

| | Aspherical Coefficient | | | | |
|---|---|---|---|---|---|
| | R | K | A4 | A6 | A8 | A10 |
| R8  | −37.3819 | 0.0 | 1.9815E−06  | −2.7651E−06 | 0.0        | 0.0 |
| R18 | 24.7896  | 0.0 | −1.2904E−06 | 2.3488E−06  | 0.0        | 0.0 |
| R23 | −24.6483 | 0.0 | 4.3660E−06  | −1.1800E−06 | 0.0000E+00 | 0.0 |
| R27 | 27.8216  | 0.0 | 8.4502E−06  | −4.8414E−06 | 3.8814E−10 | 0.0 |

FIGS. 8A, 8B, and 8C are cross-sectional views of a zoom lens according to the second embodiment. Here, FIGS. 8A, 8B, and 8C illustrate the zoom lens at a wide angle end, an intermediate area (position), and a telephoto end, respectively. Since a configuration of the zoom lens according to the second embodiment is basically the same as that of the first embodiment, the third digit (i.e., the hundreds digit) in the reference numeral of the corresponding lens is replaced by "2" (e.g., lenses L201 to L218 respectively correspond to lenses L101 to L118). The aberrations of the second embodiment are illustrated in FIGS. 9 to 14.

Third Embodiment

Figure 15A:
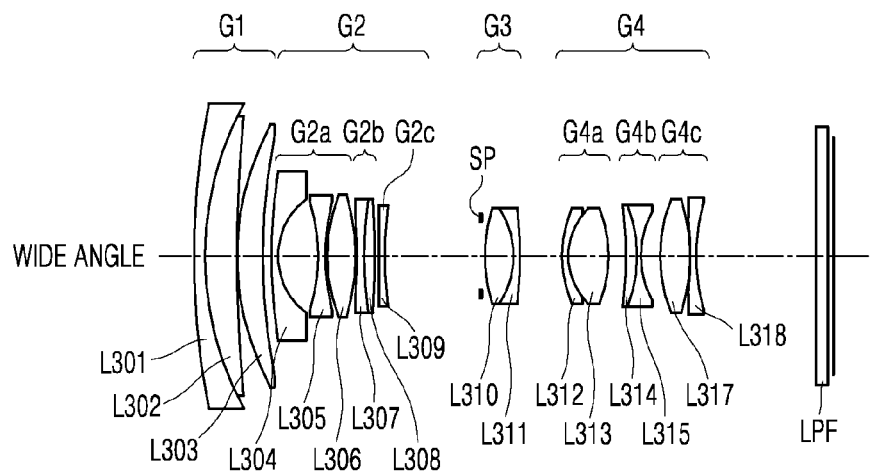
FIGS. 15A to 15C are cross-sectional views of a zoom lens, according to another embodiment.
Figure 15B:
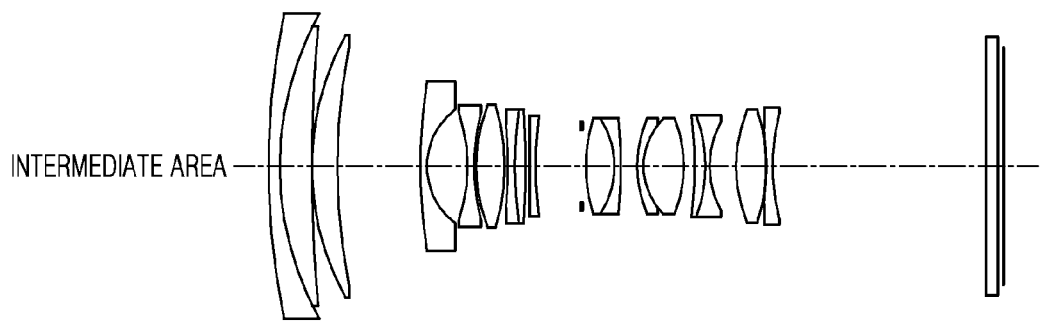

Table 8 shows surface data of a zoom lens of a third embodiment (FIGS. 15A-15B).

TABLE 8

| | | R | D | nd | vd |
|---|---|---|---|---|---|
| | 1  | 116.4985  | 2.00 | 1.8467 | 23.8 |
| | 2  | 49.2376   | 5.62 | 1.7292 | 54.7 |
| | 3  | 259.1234  | 0.15 |        |      |
| | 4  | 45.7588   | 4.23 | 1.8042 | 46.5 |
| | 5  | 115.5114  | D1   |        |      |
| | 6  | 75.9242   | 1.30 | 1.8810 | 40.2 |
| | 7  | 11.8669   | 6.68 |        |      |
| Aspherical Surface | 8  | −34.3579  | 1.30 | 1.8047 | 40.9 |
| | 9  | 44.0262   | 0.15 |        |      |
| | 10 | 23.7536   | 4.72 | 1.8467 | 23.8 |
| | 11 | −41.1608  | 0.68 |        |      |
| | 12 | −55.4586  | 0.90 | 1.8042 | 46.5 |
| | 13 | 69.3232   | 1.72 | 1.8052 | 25.5 |
| | 14 | −252.1668 | 1.01 |        |      |
| | 15 | −226.8848 | 1.00 | 1.6034 | 38.0 |

TABLE 8-continued

| | | R | D | nd | vd |
|---|---|---|---|---|---|
| | 16 | 57.1093  | D2      |        |      |
| | 17 | Aperture | 0.77968 |        |      |
| Aspherical Surface | 18 | 23.7267  | 4.78    | 1.5892 | 60.6 |
| | 19 | −14.2195 | 1       | 1.8340 | 37.3 |
| | 20 | −75.2169 | D3      |        |      |
| | 21 | 19.5062  | 1.00    | 1.8340 | 37.3 |
| | 22 | 11.1658  | 6.60    | 1.5892 | 60.6 |
| Aspherical Surface | 23 | −20.1590 | D4      |        |      |
| Aspherical Surface | 24 | −59.9121 | 1.74    | 1.6848 | 31.2 |
| | 25 | −25.6667 | 0.80    | 1.5168 | 64.2 |
| | 26 | 16.0078  | D5      |        |      |
| | 27 | 26.7977  | 4.91    | 1.4970 | 81.6 |

TABLE 8-continued

| | R | D | nd | vd |
|---|---|---|---|---|
| 28 | −26.7977 | 0.15 |        |      |
| 29 | −63.6571 | 1.00 | 1.7234 | 38.0 |
| 30 | 42.0839  | D6   |        |      |
| 31 | Plane    | 2.00 | 1.5168 | 64.2 |
| 32 | Plane    | 1.00 |        |      |

Table 9 shows data regarding a variable distance during zooming by the zoom lens of the third embodiment at the wide angle end, the intermediate position, and the telephoto end.

TABLE 9

|    | f = 16.5 | f = 30.0 | f = 77.6 |
|----|----------|----------|----------|
| D1 | 1.25     | 13.65    | 32.25    |
| D2 | 15.93    | 7.71     | 2.57     |
| D3 | 7.32     | 3.06     | 0.51     |
| D4 | 3.16     | 1.90     | 1.40     |
| D5 | 3.40     | 4.66     | 5.16     |
| D6 | 19.97    | 35.56    | 46.40    |

Table 10 shows aspherical coefficients of the aspherical lens surfaces in the zoom lens of the third embodiment.

TABLE 10

| | Aspherical Coefficient | | | | | |
|---|---|---|---|---|---|---|
| | R | K | A4 | A6 | A8 | A10 |
| R8 | −34.3579 | 0.0 | −3.2379E−06 | −1.2913E−06 | 0.0 | 0.0 |
| R18 | 23.7267 | 0.0 | −4.1568E−06 | 4.3892E−06 | 0.0 | 0.0 |
| R23 | −20.1590 | 0.0 | 7.2391E−06 | −2.5610E−06 | 0.0000E+00 | 0.0 |
| R24 | 59.9121 | 0.0 | 1.2950E−06 | −3.1890E−06 | 2.3008E−10 | 0.0 |

Figure 15C:
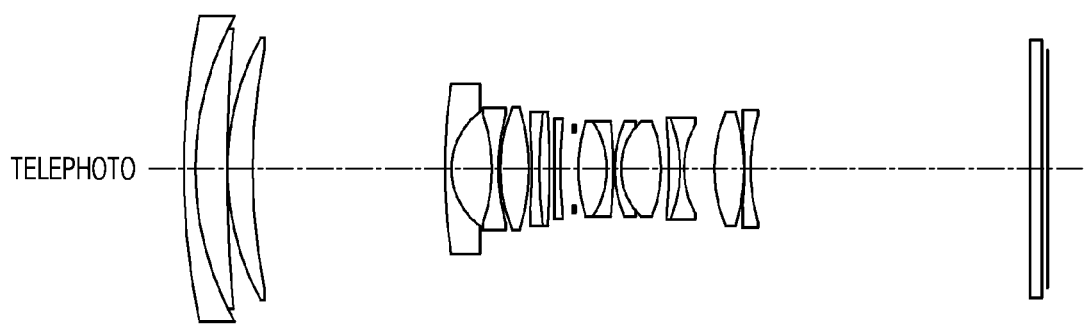
Figure 17:
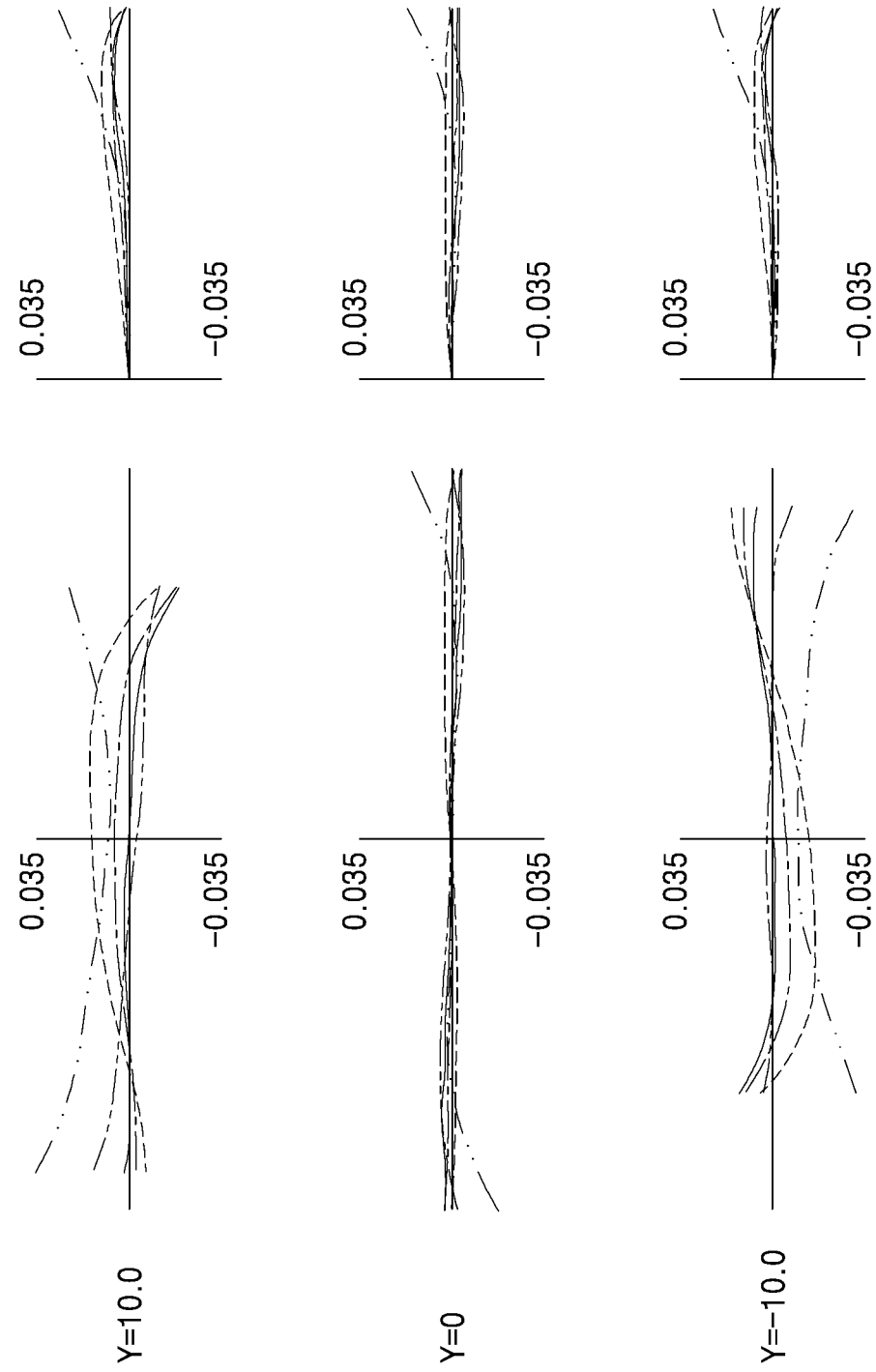
Figure 18:
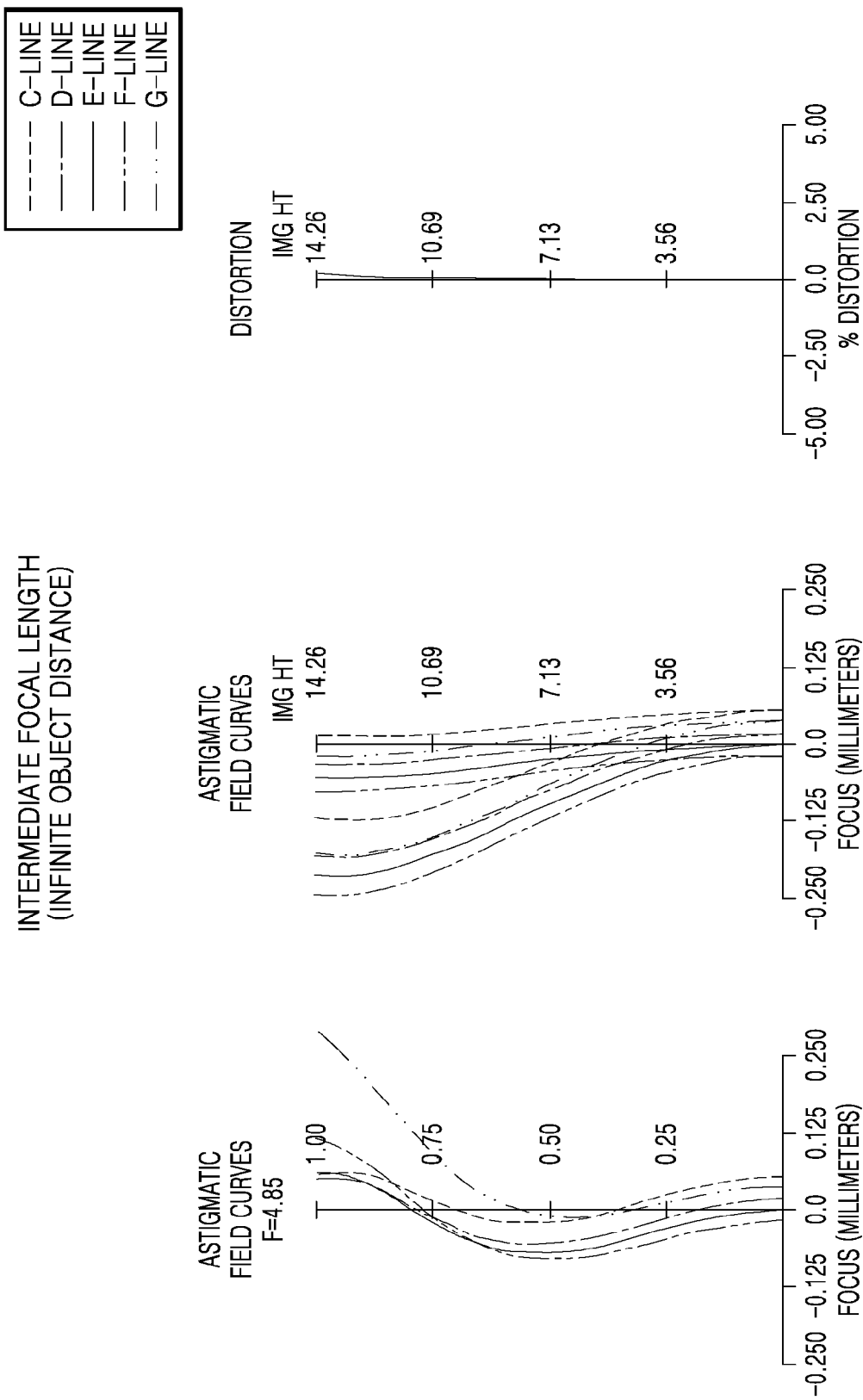
Figure 19:
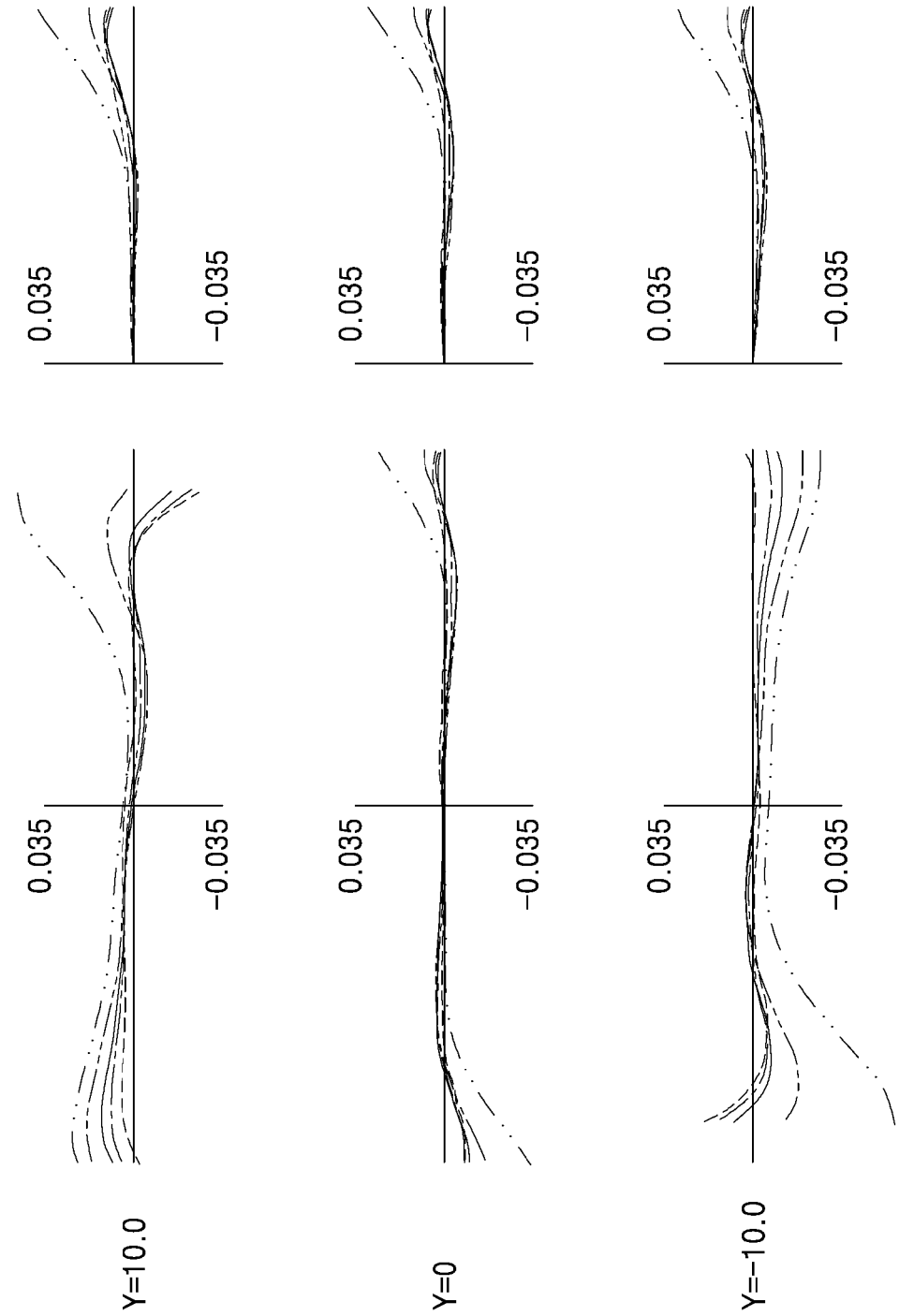
Figure 20:
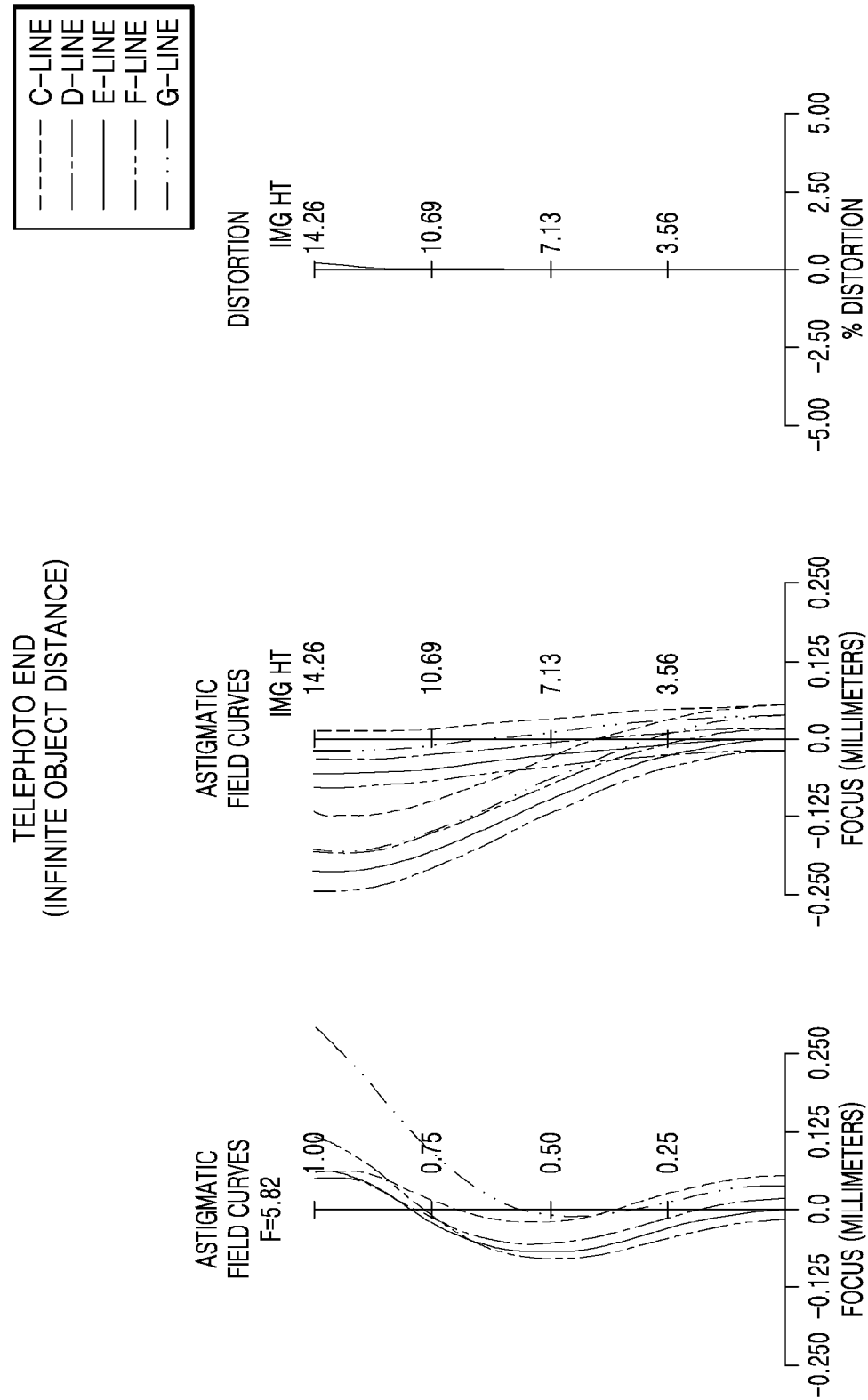
Figure 21:
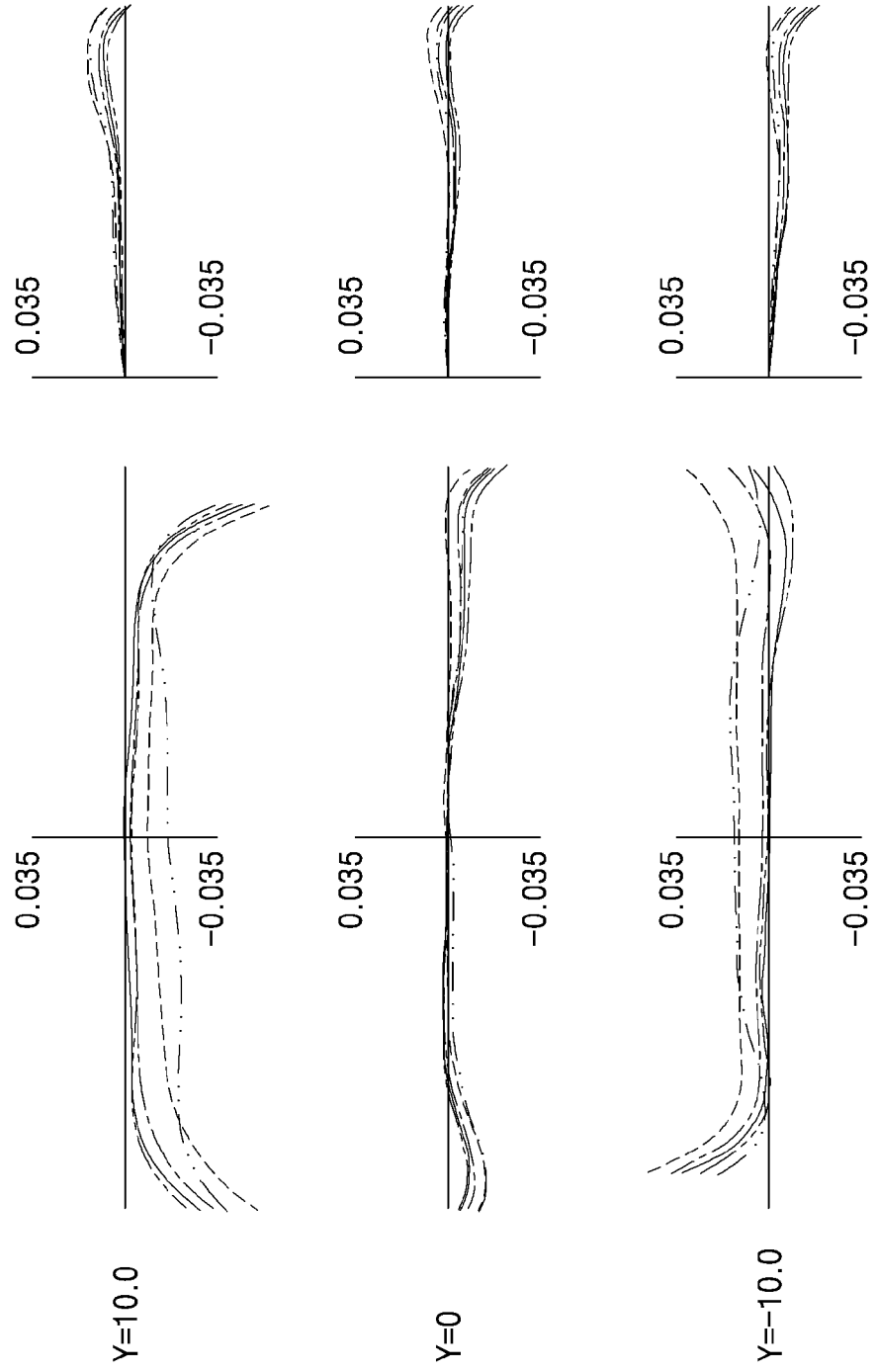

FIGS. 15A, 15B, and 15C are cross-sectional views of a zoom lens according to the third embodiment. Here, FIGS. 15A, 15B, and 15C illustrate the zoom lens at a wide angle end, an intermediate area (position), and a telephoto end, respectively. Since a configuration of the zoom lens according to the third embodiment is basically the same as that of the first embodiment, the third digit (i.e., hundreds digit) in the reference numeral of the corresponding lens is replaced by "3" (e.g., lenses L301 to L318 respectively correspond to lenses L101 to L118). In addition, the fourth C lens group G4c includes only a lens L317 and a lens L318 (i.e., there is no meniscus lens L116 as compared with the zoom lens in the first embodiment).

The aberrations of the third embodiment are illustrated in FIGS. 16 to 21. From the aberration diagram of FIGS. 16 to 21, it may be seen that chromatic aberration is corrected from the wide angle end to the telephoto end in a balanced manner.

Figure 22:
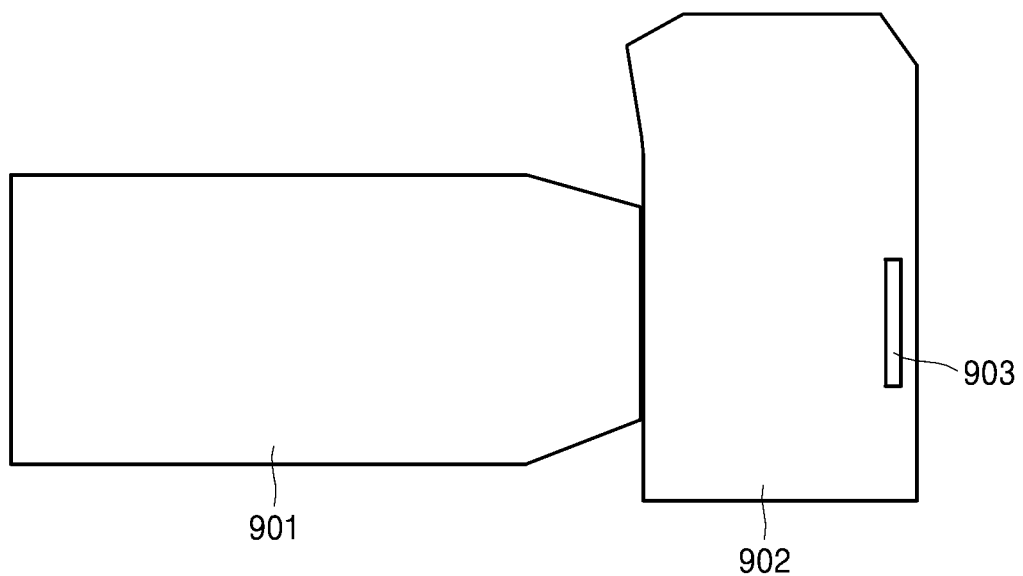
FIG. 22 is a diagram illustrating a zoom lens that is included as an interchangeable lens in a camera, according to an embodiment.

FIG. 22 is a diagram illustrating a zoom lens according to the above-mentioned embodiments as an interchangeable lens in a camera. Although a camera is shown, the zoom lens may be used with any electronic device having image capturing or photographing capability. Referring to FIG. 22, the zoom lens according to the above-mentioned embodiment may be used as an interchangeable lens 901. The interchangeable lens 901 may be detachably coupled to a camera main body 902. A solid-state imaging device 903, such as a CCD or a CMOS imaging device, is disposed in the camera main body 902 so as to capture an image that is formed through the zoom lens. In addition, a silver halide film may be used instead of the solid state imaging device 903.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A zoom lens comprising, sequentially from an object side:
   a first lens group having a positive refractive power;
   a second lens group having a negative refractive power; and
   a third lens group having a positive refractive power,
   wherein when zoom is changed from a wide angle end to a telephoto end, an interval between the first lens group and the second lens group increases, and an interval between the second lens group and the third lens group decreases, and
   the second lens group comprises, sequentially from the object side, a second A lens group having a negative refractive power and a second B lens group having a negative refractive power, and the second B lens group is displaced in a direction perpendicular to an optical axis to perform a vibration prevention function,
   wherein the zoom lens satisfies the following conditions:

$2.0 < f1/fw < 8.0$, and $3.0 < f2b/f2 < 10.0$, wherein, f1 denotes a focal length of the first lens group, f2 denotes a focal length of the second lens group, f2b denotes a focal length of the second B lens group, and fw denotes a focal length of the zoom lens at the wide angle end, wherein the second A lens group and the second B lens group move integrally when zoom is changed.

2. The zoom lens of claim 1, wherein:
the second A lens group comprises, sequentially from the object side, a first negative lens, a second negative lens, and a positive lens; and
the zoom lens satisfies the following condition:

$$1.5 < f2a/f2 < 5.0,$$

wherein, f2a denotes a focal length of the second A lens group.

3. The zoom lens of claim 2, wherein the zoom lens further satisfies the following condition:

$$2.0 < f2a/f2 < 3.5.$$

4. The zoom lens of claim 1, wherein a lens surface of the second A lens group, which is closest to the object side, is convex toward the object side.

5. The zoom lens of claim 1, wherein:
the second A lens group comprises, sequentially from the object side, a negative meniscus lens having a convex surface facing the object side, and a cemented lens including a negative biconcave lens and a positive biconvex lens; and
the second B lens group is configured as a cemented lens including a biconcave lens and a biconvex lens.

6. The zoom lens of claim 5, wherein the second lens group further comprises:
a second C lens group that is disposed on an image side of the second B lens group; and
the second C lens group is configured as a meniscus lens having a convex surface facing the image side.

7. The zoom lens of claim 1, wherein the first lens group comprises, sequentially from the object side:
a cemented lens including a meniscus lens, which has a convex surface facing the object side, and a biconvex lens; and
a meniscus lens having a convex surface facing the object side.

8. The zoom lens of claim 1, wherein the third lens group is configured as a cemented lens including a biconvex lens and a biconcave lens.

9. The zoom lens of claim 1, further comprising a fourth lens group having a positive refractive power and is disposed on an image side of the third lens group.

10. The zoom lens of claim 9, wherein when zoom is changed from the wide angle end to the telephoto end, an interval between the third lens group and the fourth lens group decreases.

11. An electronic device comprising:
the zoom lens of claim 1; and
an imaging element that receives an optical image formed by the zoom lens and converts the optical image into an electrical image signal.

12. A camera comprising:
a housing;
the zoom lens of claim 1 that is configured as an interchangeable lens and is detachably coupled to the housing; and
an imaging element disposed in the housing, receives an optical image formed by the zoom lens, and converts the optical image into an electrical image signal.

13. A zoom lens comprising, sequentially from an object side:
a first lens group having a positive refractive power;
a second lens group having a negative refractive power; and
a third lens group having a positive refractive power,
wherein when zoom is changed from a wide angle end to a telephoto end, an interval between the first lens group and the second lens group increases, and an interval between the second lens group and the third lens group decreases, and
the second lens group comprises, sequentially from the object side, a second A lens group having a negative refractive power and a second B lens group having a negative refractive power, and the second B lens group is displaced in a direction perpendicular to an optical axis to perform a vibration prevention function,
wherein the zoom lens satisfies the following conditions:

$$2.0 < f1/fw < 8.0,$$

$$3.0 < f2b/f2 < 10.0,$$

$$0.03 < |f2|/ft < 0.25, \text{ and}$$

$$0.1 < f3/ft < 1.0,$$

wherein, f1 denotes a focal length of the first lens group, f2 denotes a focal length of the second lens group, f2b denotes a focal length of the second B lens group, fw denotes a focal length of the zoom lens at the wide angle end, f3 denotes the focal length of the third lens group, and ft denotes a focal length of the zoom lens at the telephoto end.

14. The zoom lens of claim 13, wherein the zoom lens further satisfies the following conditions:

$$0.05 < |f2|/ft < 0.20, \text{ and}$$

$$0.2 < f3/ft < 0.8.$$

* * * * *